US011348552B2

(12) United States Patent
Song

(10) Patent No.: US 11,348,552 B2
(45) Date of Patent: May 31, 2022

(54) METHOD FOR DETERMINING DATA PROCESSING SEQUENCE, DISPLAY APPARATUS AND DISPLAY METHOD THEREOF

(71) Applicant: BOE TECHNOLOGY GROUP CO., LTD., Beijing (CN)

(72) Inventor: Danna Song, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/608,417

(22) PCT Filed: Jan. 23, 2019

(86) PCT No.: PCT/CN2019/072750
§ 371 (c)(1),
(2) Date: Oct. 25, 2019

(87) PCT Pub. No.: WO2019/184569
PCT Pub. Date: Oct. 3, 2019

(65) Prior Publication Data
US 2020/0082787 A1 Mar. 12, 2020

(30) Foreign Application Priority Data
Mar. 28, 2018 (CN) .......................... 201810267223.2

(51) Int. Cl.
*G09G 5/02* (2006.01)
*G09G 3/20* (2006.01)
(Continued)

(52) U.S. Cl.
CPC ................. *G09G 5/02* (2013.01); *G06K 9/62* (2013.01); *G06V 10/40* (2022.01); *G09G 3/2003* (2013.01);
(Continued)

(58) Field of Classification Search
CPC ...... G09G 5/02; G09G 3/2003; G09G 3/3208; G09G 3/3225; G09G 2310/027;
(Continued)

(56) References Cited

U.S. PATENT DOCUMENTS 8,890,795 B2 * 11/2014 Seetzen .................. G09G 3/342
345/102
2008/0284767 A1 * 11/2008 Mori ..................... G09G 3/3225
345/207

(Continued)

FOREIGN PATENT DOCUMENTS

CN         106154673 A      11/2016

OTHER PUBLICATIONS

Office Action issued in Indian Patent Application No. 201947051012, dated Jul. 28, 2021; with English translation.

(Continued)

*Primary Examiner* — Amare Mengistu
*Assistant Examiner* — Jennifer L Zubajlo
(74) *Attorney, Agent, or Firm* — McDermott Will & Emery LLP

(57) ABSTRACT

A method for determining a data processing sequence, for determining a selected color in a plurality of colors display by subpixels included in each pixel of a display apparatus, and the method comprising: determining, according to gray-scale values of subpixels of candidate colors in a plurality of pixels included in a plurality of frames of images displayed in a current detection cycle, a usage level representative value of each candidate color in the current detection cycle; and selecting one of the candidate colors as a selected color of a next detection cycle according to detection sequence determining parameters, the detection sequence determining parameters including the usage level representative value of each candidate color in the current detection cycle. By this (Continued)

method, the subpixels of colors with large usage level representative values may be detected and compensated in time.

16 Claims, 8 Drawing Sheets

(51) Int. Cl.
    *G09G 3/3225* (2016.01)
    *G09G 3/3208* (2016.01)
    *G06K 9/62* (2022.01)
    *G06V 10/40* (2022.01)

(52) U.S. Cl.
    CPC ......... *G09G 3/3208* (2013.01); *G09G 3/3225* (2013.01); *G09G 2310/027* (2013.01); *G09G 2320/043* (2013.01); *G09G 2320/0666* (2013.01); *G09G 2340/16* (2013.01); *G09G 2360/16* (2013.01)

(58) Field of Classification Search
    CPC ........... G09G 2340/16; G09G 2360/16; G09G 2320/043; G09G 2320/045; G09G 2320/048; G09G 2320/0666; G06K 9/46; G06K 9/62
    See application file for complete search history.

(56) References Cited

U.S. PATENT DOCUMENTS

| | | | |
|---|---|---|---|
| 2014/0055500 A1* | 2/2014 | Lai | G09G 3/006 345/77 |
| 2015/0194096 A1* | 7/2015 | Chung | G09G 3/3225 345/78 |
| 2016/0191952 A1* | 6/2016 | Kim | G09G 3/3233 375/240.27 |
| 2017/0076659 A1* | 3/2017 | Zhang | G09G 3/2003 |
| 2017/0076661 A1* | 3/2017 | Zhang | G09G 3/2003 |
| 2018/0247588 A1* | 8/2018 | Lee | G09G 3/3225 |
| 2018/0268752 A1* | 9/2018 | Zhuang | G09G 3/2074 |
| 2019/0221158 A1* | 7/2019 | An | G09G 3/003 |
| 2020/0402446 A1* | 12/2020 | Wang | G09G 3/3208 |

OTHER PUBLICATIONS

Extended European Search Report issued in corresponding European Patent Application No. 19775201.7, dated Nov. 15, 2021.
Examination Report issued in Indian Patent Application No. 202027048228, dated Aug. 12, 2021; with English translation.

\* cited by examiner

10

10

Selected color of the previous detection cycle: Green

Selected color of the current detection cycle: Red

Candidate colors of the current detection cycle:

Blue
 White (not obtained)
 Green (not obtained)

First interval
Second interval
Third interval

METHOD FOR DETERMINING DATA PROCESSING SEQUENCE, DISPLAY APPARATUS AND DISPLAY METHOD THEREOF

CROSS-REFERENCE TO RELATED APPLICATIONS

This application is a national phase entry under 35 USC 371 of International Patent Application No. PCT/CN2019/072750 filed on Jan. 23, 2019, which claims priority to Chinese Patent Application No. 201810267223.2. filed with the Chinese Patent Office on Mar. 28, 2018, titled "A METHOD FOR DETERMINING DATA PROCESSING SEQUENCE, DISPLAY APPARATUS AND DISPLAY METHOD THEREOF", which are incorporated herein by reference in their entirety.

TECHNICAL FIELD

The present disclosure relates to the field of display technologies, and in particular, to a method for determining a data processing sequence, a display apparatus, and a display method thereof.

BACKGROUND

At present, organic electro-luminescent display (OLED) apparatus have stood out in the display field due to their thin thickness, low power consumption, high response, high resolution, and other advantages, and have been widely used in the industry.

However, a serious problem exists in OLED display products, that is, the driving thin film transistors (TFTs) in the subpixels will age over time due to repeated use. As the TFTs age, the photoelectric conversion efficiency thereof will decrease, which will affect the display effect of the OLED display product.

SUMMARY

Some embodiments of the present disclosure provide a method for determining a data processing sequence, for use in determining a selected color in a plurality of colors display by subpixels included in each pixel of a display apparatus. The method for determining a data processing sequence includes: determining a usage level representative value of each candidate color in a current detection cycle according to grayscale values of subpixels of candidate colors in a plurality of pixels included in a plurality of frames of images displayed in the current detection cycle, the selected color being one of the plurality of colors, and the candidate colors being colors other than the selected color in the plurality of colors; and selecting one of the candidate colors as a selected color of a next detection cycle according to detection sequence determining parameters, the detection sequence determining parameters including the usage level representative value of each candidate color in the current detection cycle.

In some embodiments, a usage level representative value of a candidate color is a sum of usage levels of all subpixels of the candidate color in the plurality of pixels.

In some embodiments, determining a usage level representative value of each candidate color in a current detection cycle according to grayscale values of subpixels of candidate colors in a plurality of pixels included in a plurality of frames of images displayed in the current detection cycle includes: obtaining a display level corresponding to subpixels of each candidate color in a frame of image according to a sum of grayscale values of the subpixels of each candidate color in a plurality of pixels included in the frame of image and a corresponding relationship between preset grayscale ranges and display levels; and adding up display levels of the subpixels of each candidate color in the plurality of frames of images displayed in the current detection cycle to obtain the usage level representative value of each candidate color in the current detection cycle.

In some embodiments, obtaining a display level corresponding to subpixels of each candidate color in a frame of image according to a sum of grayscale values of the subpixels of each candidate color in a plurality of pixels included in the frame of image and a corresponding relationship between preset grayscale ranges and display levels includes: in a case where a number of subpixels of the candidate color with a grayscale value greater than or equal to q in the plurality of pixels included in the frame of image is in a range of 0 to m, if the sum of grayscale values of the subpixels of the candidate color in the plurality of pixels included in the frame of image is in a range of 0 to $$\frac{(n \times 255)}{4},$$

determining that a display level of the subpixels of the candidate color is a; if the sum of the grayscale values of the subpixels of the candidate color in the plurality of pixels included in the frame of image is in a range of $$\frac{(n \times 255)}{4} \text{ to } \frac{(n \times 255)}{2},$$

determining that a display level of the subpixels of the candidate color is b; if the sum of the grayscale values of the subpixels of the candidate color in the plurality of pixels included in the frame of image is in a range of $$\frac{(n \times 255)}{2} \text{ to } \frac{3(n \times 255)}{4},$$

determining that a display level of the subpixels of the candidate color is c; if the sum of the grayscale values of the subpixels of the candidate color in the plurality of pixels included in the frame of image is in a range of $$\frac{3(n \times 255)}{4}$$

to 255n, determining that a display level of the subpixels of the candidate color is d; wherein n is a number of the plurality of pixels included in the frame of image, m is 1% to 10% of the number of the plurality of pixels included in the frame of image, a is less than b, b is less than c, and c is less than d and q is greater than or equal to 200; and in a case where the number of subpixels of the candidate color with a grayscale value greater than or equal to q in the plurality of pixels included in the frame of image is in a range of m to n, determining that a display level of the subpixels of the candidate color is d.

In some embodiments, selecting one of the candidate colors as a selected color of a next detection cycle according to detection sequence determining parameters includes: dividing a range of usage degree representative values of the candidate colors in the current detection cycle by using a first threshold value and a second threshold value, to obtain a first interval, a second interval, and a third interval, usage level representative values of the first interval, the second interval, and the third interval being gradually decreased;

if there are candidate color(s) whose usage level representative value(s) fall into the first interval, selecting one of the candidate color(s) whose usage level representative value(s) fall into the first interval as the selected color of the next detection cycle; if the usage level representative values of the candidate colors all fall into the second interval or the second interval and the third interval, selecting one of candidate color(s) whose usage level representative value(s) fall into the second interval as the selected color of the next detection cycle; and if the usage level representative values of the candidate colors all fall into the third interval, selecting one of the candidate colors as the selected color of the next detection cycle; wherein the first threshold value is a boundary point between the first interval and the second interval, the second threshold value is a boundary point between the second interval and the third interval, and the first threshold value is greater than the second threshold value.

In some embodiments, the detection sequence determining parameters further include a selected color of a previous detection cycle; and selecting one of the candidate colors as a selected color of a next detection cycle according to detection sequence determining parameters includes: dividing a range of usage degree representative values of the candidate colors in the current detection cycle by using a first threshold value and a second threshold value, to obtain a first interval, a second interval, and a third interval, usage level representative values of the first interval, the second interval, and the third interval being gradually decreased;

in a case where there are candidate color(s) whose usage level representative value(s) fall into the first interval, if the candidate color(s) whose usage level representative value(s) fall into the first interval include the selected color of the previous detection cycle and color(s) other than the selected color of the previous detection cycle, selecting one of the candidate color(s) whose usage level representative values fall into the first interval other than the selected color of the previous detection cycle as the selected color of the next detection cycle; if the candidate color(s) whose usage level representative value(s) fall into the first interval do not include the selected color of the previous detection cycle, selecting one of the candidate color(s) whose usage level representative value(s) fall into the first interval as the selected color of the next detection cycle; and if the candidate color(s) whose usage level representative value(s) fall into the first interval is the selected color of the previous detection cycle, selecting the selected color of the previous detection cycle as the selected color of the next detection cycle;

in a case where the usage level representative values of the candidate colors all fall into the second interval or the second interval and the third interval, if candidate color(s) whose usage level representative value(s) fall into the second interval include the selected color of the previous detection cycle and color(s) other than the selected color of the previous detection cycle, selecting one of the candidate color(s) whose usage level representative value(s) fall into the second interval other than the selected color of the previous detection cycle as the selected color of the next detection cycle; if the candidate color(s) whose usage level representative value(s) fall into the second interval do not include the selected color of the previous detection cycle, selecting one of the candidate color(s) whose usage level representative value(s) fall into the second interval as the selected color of the next detection cycle; and if the candidate color(s) whose usage level representative value(s) fall into the second interval is the selected color of the previous detection cycle, selecting the selected color of the previous detection cycle as the selected color of the next detection cycle; and in a case where the usage level representative values of the candidate colors all fall into the third interval, selecting one of the candidate colors other than the selected color of the previous detection cycle as the selected color of the next detection cycle, wherein the first threshold value is a boundary point between the first interval and the second interval, the second threshold value is a boundary point between the second interval and the third interval, and the first threshold value is greater than the second threshold value.

In some embodiments, the detection sequence determining parameters further include priorities of the candidate colors; and among the priorities of the candidate colors, a selected color of a previous detection cycle has a lowest priority; and selecting one of the candidate colors as a selected color of a next detection cycle according to detection sequence determining parameters includes: dividing a range of usage degree representative values of the candidate colors in the current detection cycle by using a first threshold value and a second threshold value, to obtain a first interval, a second interval, and a third interval, usage level representative values of the first interval, the second interval, and the third interval being gradually decreased;

sequentially determining intervals into which the usage level representative values of the candidate colors respectively fall according to the priorities of the candidate colors; selecting a candidate color as the selected color of the next detection cycle if a usage level representative value of the candidate color falls into the first interval; selecting a candidate color having a highest priority among candidate color(s) whose usage level representative value(s) fall into the second interval as the selected color of the next detection cycle if the usage level representative values of the candidate colors all fall into the second interval or the second interval and the third interval; and selecting a candidate color having a highest priority among the candidate colors as the selected color of the next detection cycle if the usage level representative values of the candidate colors all fall into the third interval, wherein the first threshold value is a boundary point between the first interval and the second interval, the second threshold value is a boundary point between the second interval and the third interval, and the first threshold value is greater than the second threshold value.

In some embodiments, the first threshold value is $\frac{2}{3}$ P; the second threshold value is $\frac{1}{3}$ P; and P is a product of a number of frames of images in the current detection cycle and a maximum value of the display levels; and the display levels are divided into: level 0, level 1, level 2, and level 3.

Some embodiments of the present disclosure provide a display method of a display apparatus. The display method includes: determining the selected color of the next detection cycle according to the method described above. The display method further includes: in the next detection cycle, detecting preset detection parameters of the subpixels of the selected color in the display apparatus; and determining whether to compensate the subpixels of the selected color in the display apparatus according to the detected preset detection parameters of the subpixels of the selected color; if yes, compensating the subpixels of the selected color in the display apparatus; if no, not compensating the subpixels of the selected color in the display apparatus.

Some embodiments of the present disclosure provide a display apparatus. The display apparatus includes pixels, and each pixel includes subpixels for displaying a plurality of colors. The display apparatus further includes a memory and a processor. The memory is configured to store instruction(s). The processor is coupled to the memory. The instruction(s), when are executed by the processor, cause the processor to: determine a usage level representative value of each candidate color in a current detection cycle according to grayscale values of subpixels of candidate colors in a plurality of pixels included in a plurality of frames of images displayed by pixels in the display apparatus in the current detection cycle, the current detection cycle being used for detecting preset detection parameters of subpixels of the selected color in all or a portion of the pixels of the display apparatus, the selected color being one of the plurality of colors, and the candidate colors being colors other than the selected color in the plurality of colors; and select one of the candidate colors as a selected color of a next detection cycle according to detection sequence determining parameters, the detection sequence determining parameters including the usage level representative value of each candidate color in the current detection cycle.

The display apparatus has the same limitations as those of the method for determining a data processing sequence described above, and details are not described herein again.

In some embodiments, the display apparatus further includes a detector. The detector is configured to detect preset detection parameters of subpixels of the selected color of the next detection cycle in all or a portion of the pixels of the display apparatus. The instruction(s), when are executed by the processor, further cause the processor to: determine whether to compensate the subpixels of the selected color according to the detected preset detection parameters of the subpixels of the selected color; if yes, compensate the subpixels of the selected color; if no, not compensate the subpixels of the selected color.

Some embodiments of the present disclosure provide a computer readable storage medium storing program codes. When the program codes are executed, the method for determining a data processing sequence described above is implemented.

Some embodiments of the present disclosure provide a computer program product including program codes that, when are run on a display apparatus, cause the display apparatus to perform the method for determining a data processing sequence described above.

BRIEF DESCRIPTION OF THE DRAWINGS

In order to describe technical solutions in embodiments of the present disclosure and in the related art more clearly, the accompanying drawings to be used in the description of embodiments and the related art will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
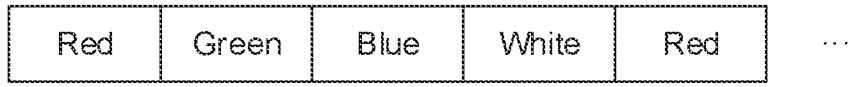
FIG. 1 is a diagram of a detection sequence of subpixels in a display apparatus according to the related art.

Since aging of driving TFTs affects a display effect of a display apparatus, a method of detecting a degree of aging of the driving TFTs and compensating corresponding driving TFTs is adopted to ensure normal display of the display product. The related art provides a method of detecting the degree of aging of driving TFTs of subpixels of a single color in one row of subpixels between two frames of images. As shown in FIG. 1, in the related art, the degree of aging of driving TFTs of subpixels of different colors is detected and corresponding subpixels are compensated in an order of, for example, red, green, blue, and white. Moreover, the degree of aging of the driving TFTs is continuously detected and corresponding subpixels are continuously compensated in this order.

However, in a case where the display product has 2160 rows of subpixels, it takes 2160 frames to complete detection of driving TFTs of all subpixels of a single color. In a case where the display product includes subpixels of four colors, after the driving TFTs of all subpixels of a certain color is detected, it takes 2160×3 frames to detect the driving TFTs in the subpixels of the color again. When a certain color is used frequently, the driving TFTs in subpixels of the color will age faster, and aging of driving TFTs in subpixels of other colors that are used less frequently is not obvious. As a result, it may not be possible to detect fast-aging TFTs and compensate corresponding TFTs in time.

Based on this, some embodiments of the present disclosure provide a method for determining a data processing sequence, for use in determining a selected color in a display apparatus displaying a plurality of colors, in order to perform data processing on the selected color. The display apparatus includes a plurality of pixels, and each pixel includes a plurality of subpixels for displaying the plurality of colors. Colors of the plurality of subpixels in each pixel are not limited. For example, each pixel includes a red subpixel, a green subpixel, and a blue subpixel. For another example, each pixel includes a red subpixel, a green subpixel, a blue subpixel, and a white subpixel.

In some embodiments, the display apparatus only includes a display panel. In some other embodiments, in addition to the display panel, the display apparatus further includes other components, such as a driver integrated circuit (IC). In some embodiments, the display apparatus is a liquid crystal display (LCD). In some other embodiments, the display apparatus is a self-luminous display apparatus. Since the self-luminous display apparatus can emit light itself, it does not need a backlight module to provide light required for display. Therefore, the self-luminous display apparatus has a simpler structure relative to the liquid crystal display. In some embodiments, the self-luminous display apparatus is an organic light-emitting display (OLED). In some other embodiments, the self-luminous display apparatus is a quantum dot light-emitting display (QLED).

Figure 2:
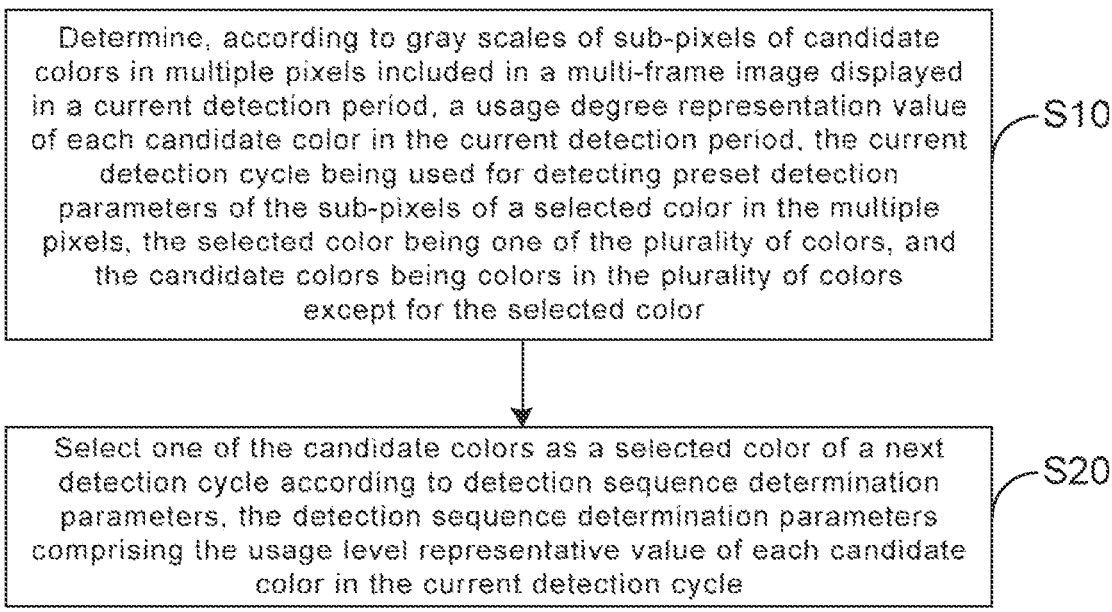
FIG. 2 is a schematic flowchart of determining a selected color of a next detection cycle according to some embodiments of the present disclosure.

As shown in FIG. 2, in some embodiments, the method for determining a data processing sequence includes the following steps.

In S10, a usage level representative value of each candidate color in a current detection cycle is determined according to grayscale values of subpixels of candidate colors in a plurality of pixels included in a plurality of frames of images displayed in the current detection cycle. The current detection cycle is used for detecting preset detection parameters of subpixels of a selected color in the plurality of pixels, the selected color is one of the plurality of colors, and the candidate colors are colors other than the selected color in the plurality of colors.

In some embodiments, the usage level representative value of a candidate color is a sum of usage levels of all subpixels of the candidate color in the plurality of pixels. In some other embodiments, the usage level representative value of a candidate color is an average usage level of all subpixels of the candidate color in the plurality of pixels. In some other embodiments, the usage level representative value of a candidate color is a relationship between grayscale values of all subpixels of the candidate color in the plurality of pixels and an attenuation rate of the candidate color itself.

It will be understood that a plurality of frames of images are displayed in each detection cycle, and the number of frames of images displayed in each detection cycle is the same. For example, in some embodiments of the present disclosure, the number of frames of images displayed in the current detection cycle is the same as the number of frames of images displayed in a next detection cycle.

When the display apparatus displays images, since the displayed contents are different, the usage level representative values of the candidate colors are also different. Moreover, in different detection cycles, since grayscale values of subpixels of a same color may be different, the usage level representative values of the subpixels of the same color may be different in different detection cycles.

A usage level representative value of a candidate color represents a degree of use of the candidate color. Those skilled in the art will understand that, the greater the grayscale values of the subpixels of the candidate color, the greater the usage level representative value of the candidate color. The greater the usage level representative value of the candidate color, the faster the driving TFTs of the subpixels of the color age.

A frame of image of the display apparatus includes a plurality of pixels. In some embodiments, the plurality of pixels included in the frame of image correspond to all pixels of the display apparatus. In some other embodiments, the plurality of pixels included in the frame of image correspond to a portion of pixels of the display apparatus. That is, in some embodiments, the usage level representative value of a candidate color is the sum of usage levels of all subpixels of the candidate color in all pixels of the display apparatus. In some other embodiments, the usage level representative value of a candidate color is the sum of usage levels of all subpixels of the candidate color in a portion of pixels of the display apparatus. Those skilled in the art will understand that when a frame of image is displayed, a plurality of pixels in the display apparatus are driven row by row. In some embodiments, the preset detection parameters of the subpixels of the selected color in the display apparatus are detected between two adjacent frames of images. In addition, under the premise of not affecting the display effect of the display apparatus, in some embodiments, a plurality of frames of images are displayed in a detection cycle, and the preset detection parameters of all subpixels of the selected color in the display apparatus are detected portion by portion during a display time of the plurality of frames of images. In some embodiments, preset detection parameters of a single row of subpixels of the selected color in the display apparatus are detected between two adjacent frames of images.

For example, 2160 rows of red subpixels in the display apparatus are detected in one detection cycle, and 2160 frames of images are displayed in the detection cycle. In this case, preset detection parameters of only one row of red subpixels in the display apparatus are detected between every two adjacent frames of images.

The preset detection parameters of the subpixels of the selected color are used to indicate the degree of aging of the subpixels of the selected color. In some embodiments, the preset detection parameter is a degree of drift of a threshold voltage (Vth) of the driving TFT. In some other embodiments, the preset detection parameter is a ratio of display luminance to current in the display apparatus.

In S20, one of the candidate colors is selected as a selected color of a next detection cycle according to detection sequence determining parameters. The detection sequence determining parameters include the usage level representative value of each candidate color in the current detection cycle.

Which method is used to select one of the candidate colors as the selected color of the next detection cycle is not limited. In some embodiments, one of the candidate colors is selected as the selected color of the next detection cycle only according to the usage level representative value of each candidate color in the current detection cycle. In some other embodiments, one of the candidate colors is selected as the selected color of the next detection cycle according to the usage level representative value of each candidate color in the current detection cycle and other factors, such as a selected color of a previous detection cycle or priorities of the candidate colors described below.

In a case where the detection sequence determining parameters include the usage level representative value of each candidate color in the current detection cycle, in some embodiments, the step of selecting one of the candidate colors as the selected color of the next detection cycle includes: selecting a color with the largest usage level representative value from the candidate colors as the selected color of the next detection cycle.

After the selected color of the next detection cycle is selected, data processing is performed on the subpixels of the selected color. Performing data processing on the selected color includes: performing display compensation on the subpixels of the selected color.

In some embodiments, performing display compensation on the subpixels of the selected color includes: detecting preset detection parameters of the subpixels of the selected color, and compensating the subpixels of the selected color according to the preset detection parameters. In some other embodiments, according to the data processing sequence, other processing procedures are performed on the subpixels of the selected color, which is not limited herein.

In each detection cycle, display compensation is only performed on the subpixels of the selected color, and not performed on subpixels of colors other than the selected color. Only signals calculated according to an image to be displayed are input to the subpixels of colors other than the selected color. For example, for a red subpixel and a blue subpixel, it is calculated from a frame of image that a voltage of 10V needs to be applied to the red subpixel and a voltage of 15V needs to be applied to the blue subpixel. Red is the selected color of the current detection cycle, and it is known from the preset detection parameter that the red subpixel needs to be compensated with a voltage of 1V. Therefore, when the frame of image is displayed, a voltage of 11 V is applied to the red subpixel, and a voltage of 15V is still applied to the blue subpixel. The embodiments of the present disclosure provide a data processing sequence for use in determining a selected color in a display apparatus displaying a plurality of colors. The usage level representative value of each candidate color in the current detection cycle is related to the grayscale values of the subpixels of the candidate colors in the plurality of pixels included in plurality of frames of images displayed in the current detection cycle, and the usage level representative value of each candidate color in the current detection cycle is determined according to the grayscale values of the subpixels of the candidate colors in the plurality of pixels included in the plurality of frames of images displayed in the current detection cycle. Then, according to the usage level representative value of each candidate color in the current detection cycle, one of the candidate colors is selected as the selected color of the next detection cycle, and the preset detection parameters of the subpixels of the selected color are detected in the next detection cycle. Compared with the related art, the embodiments of the present disclosure may solve the problem that the subpixels can only be detected in a fixed order of colors in the related art.

On this basis, in a detection cycle, since displayed images are different, the usage level representative values of the candidate colors are different. The greater the usage level representative value of a candidate color, the faster the driving TFTs in the subpixels of the color age. For example, in a detection cycle, the usage level representative value of red subpixels is greater, then the driving TFTs in the red subpixels age faster, and aging of driving TFTs in subpixels of other colors is not obvious. In a case where a method of detecting subpixels in a fixed order of colors in the related art is adopted, a problem may occur that subpixels of colors with large usage level representative values may not be detected and compensated in time, and time may be wasted in detecting and compensating subpixels of colors with small usage level representative values. In a case where the method for determining a data processing sequence provided by the embodiments of the present disclosure is adopted to detect the subpixels in the display apparatus, the selected color of the next detection cycle is determined according to the usage level representative value of each candidate color in the current detection cycle, and subpixels of the selected color will be detected in the next detection cycle. Since the usage level representative value of a candidate color is the sum of the usage levels of all subpixels of the candidate color in the plurality of pixels, compared with the related art, in the embodiments of the present disclosure, the subpixels of colors with large usage level representative values may be detected and compensated in time.

Figure 3:
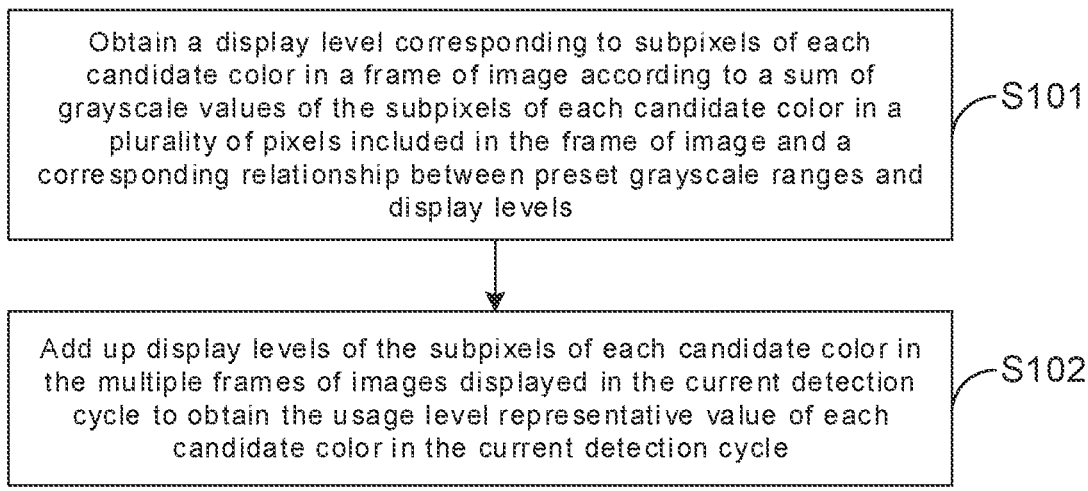
FIG. 3 is a schematic flowchart of determining a usage level representative value of each candidate color in a current detection cycle according to some embodiments of the present disclosure.

In some embodiments, the step of determining a usage level representative value of each candidate color in a current detection cycle according to grayscale values of subpixels of candidate colors in the plurality of pixels included in plurality of frames of images displayed in the current detection cycle, as shown in FIG. 3, includes the following steps.

In S101, a display level corresponding to subpixels of each candidate color in a frame of image is obtained according to a sum of grayscale values of the subpixels of each candidate color in a plurality of pixels included in the frame of image and a corresponding relationship between preset grayscale ranges and display levels.

Herein, first, the grayscale values of the subpixels of each candidate color in the plurality of pixels included in one frame of image are added up, to obtain the sum of the grayscale values of the subpixels of the candidate color in the plurality of pixels included in the frame of image. Then, reference is made to the corresponding relationship between the preset grayscale ranges and the display levels, so as to obtain a display level corresponding to the sum of the grayscale values of the subpixels of the candidate color, and thereby obtain a display level corresponding to the subpixels of the candidate color in the frame of image.

For example, in the current detection cycle, 2160 frames of images are displayed. Each frame of image includes 1000 pixels, and the 1000 pixels include 1000 red subpixels, 1000 green subpixels, 1000 blue subpixels, and 1000 white subpixels. If red subpixels are detected in the current detection cycle, then the candidate colors are green, blue, and white. Grayscale values of the 1000 green subpixels, 1000 blue subpixels, and 1000 white subpixels in the 2160 frames of images are obtained. Then, the grayscale values of the 1000 green subpixels in one frame of image are added up to obtain the sum of the grayscale values of the 1000 green subpixels; the grayscale values of the 1000 blue subpixels in the frame of image are added up to obtain the sum of the grayscale values of the 1000 blue subpixels; and the grayscale values of the 1000 white subpixels in the frame of image are added up to obtain the sum of the grayscale values of the 1000 white subpixels. After that, referring to the corresponding relationship between the preset grayscale ranges and the display levels, the display level of the green subpixels in the frame of image is obtained according to the sum of the grayscale values of the 1000 green subpixels, the display level of the blue subpixels in the frame of image is obtained according to the sum of the grayscale values of the 1000 blue subpixels, and the display level of the white subpixels in the frame of image is obtained according to the sum of the grayscale values of the 1000 white subpixels.

The corresponding relationship between the preset grayscale ranges and the display levels is not limited, as long as a display level corresponding to the sum of the grayscale values of the subpixels of each candidate color in the plurality of pixels included in one frame of image can be obtained according to reasonable preset grayscale ranges.

Those skilled in the art will understand that the grayscale value indicates a brightness of a certain color. In some embodiments, there are 256 gray levels, that is, a grayscale value of each color is in a range of 0 to 255. A grayscale value of 0 represents a minimum brightness, and a grayscale value of 255 represents a maximum brightness.

In S102, display levels of the subpixels of each candidate color in the plurality of frames of images displayed in the current detection cycle are added up to obtain the usage level representative value of each candidate color in the current detection cycle.

For example, the candidate colors are green, blue, and white. In the 2160 frames of images in the current detection cycle, display levels of the green subpixels are $x1$, $x2$, . . . , $x2159$ and $x2160$; display levels of the blue subpixels are $y1$, $y2$, . . . , $y2159$ and $y2160$; and display levels of the white subpixels are $z1$, $z2$, . . . , $z2159$ and $z2160$. After adding up the display levels of subpixels of each color, it is obtained that a sum of the display levels of the green subpixels in the 2160 frames of images is: $Sx=x1+x2+ \ldots +x2159+x2160$; a sum of the display levels of the blue subpixels in the 2160 frames of images is: $Sy=y1+y2+ \ldots +y2159+y2160$; and a sum of the display levels of the white subpixels in the 2160 frames of images is: $Sz=z1+z2+ \ldots +z2159+z2160$. Then, a usage level representative value of the green subpixels is obtained according to $Sx$; a usage level representative value of the blue subpixels is obtained according to $Sy$, and a usage level representative value of the white subpixels is obtained according to $Sz$.

In some embodiments of the present disclosure, a plurality frames of images are displayed in the current detection cycle. By calculating the sum of grayscale values of subpixels of each candidate color in a plurality of pixels included in one frame of image, the display level corresponding to the subpixels of each candidate color in the frame of image is obtained according to the sum of the grayscale values of the subpixels of the candidate color and a correspondence relationship between the preset grayscale ranges and the display levels. Then, by adding up the display levels of the subpixels of each candidate color in the plurality of frames of images, the usage level representative value of the candidate color in the current detection cycle is obtained. With this simple method, it is possible to effectively determine the usage level representative value of each candidate color in the current detection cycle according to the grayscale values of the subpixels of the candidate colors in the plurality of pixels included in the plurality of frames of images displayed in the current detection cycle.

In some embodiments, the step of obtaining a display level corresponding to subpixels of each candidate color in a frame of image according to a sum of grayscale values of the subpixels of the candidate color in a plurality of pixels included in the frame of image and a corresponding relationship between preset grayscale ranges and display levels includes the following steps.

In a case where the number of subpixels of a candidate color with a grayscale value greater than or equal to q in a plurality of pixels included in a frame of image is in a range of 0 to m, if a sum of grayscale values of the subpixels of the candidate color in the plurality of pixels included in the frame of image is in a range of 0 to $$\frac{(n \times 255)}{4},$$

a display level of the subpixels of the candidate color is a; if the sum of the grayscale values of the subpixels of the candidate color in the plurality of pixels included in the frame of image is in a range of $$\frac{(n \times 255)}{4} \text{ to } \frac{(n \times 255)}{2},$$

the display level of the subpixels of the candidate color is b; if the sum of the grayscale values of the subpixels of the candidate color in the plurality of pixels included in the frame of image is in a range of $$\frac{(n \times 255)}{2} \text{ to } \frac{3(n \times 255)}{4},$$

the display level of the subpixels of the candidate color is c; if the sum of the grayscale values of the subpixels of the candidate color in the plurality of pixels included in the frame of image is in a range of $$\frac{3(n \times 255)}{4}$$

to 255n, the display level of the subpixels of the candidate color is d. Herein, n is the number of the plurality of pixels included in the frame of image, m is 1% to 10% of the number of the plurality of pixels (that is, m is in a range of 1% n to 10% n), a is less than b, b is less than c, and c is less than d (a<b<c<d), and q is greater than or equal to 200 (q≥200). In a case where the number of subpixels of the candidate color with a grayscale value greater than or equal to q in the plurality of pixels included in the frame of image is in a range of m to n, a display level of the subpixels of the candidate color is d.

For simplicity of calculation, in some embodiments, a is set to 0, b is set to 1, c is set to 2, and d is set to 3.

Those skilled in the art will understand that, in a case where it is not specified whether a boundary point between adjacent intervals falls into an interval to the left of the boundary point or an interval to the right of the boundary point, in some embodiments, the boundary point between adjacent intervals falls into the interval to the left of the boundary point; in some other embodiments, the boundary point between adjacent intervals falls into the interval to the right of the boundary point. Those skilled in the art will understand that a boundary point does not fall into both of the two adjacent intervals defined by the boundary point at the same time.

Therefore, in some embodiments of the present disclosure, the description that the number of subpixels of the candidate color with a grayscale value greater than or equal to q in the plurality of pixels included in the frame of image is in the range of 0 to m means that: the number of subpixels of the candidate color with a grayscale value greater than, or greater than or equal to q in the plurality of pixels included in the frame of image is in a range of [0, m) or [0, m]. Correspondingly, the description that the number of subpixels of the candidate color with a grayscale value greater than or equal to q in the plurality of pixels included in the frame of image is in the range of m to n means that: the number of subpixels of the candidate color with a grayscale value greater than, or greater than or equal to q in the plurality of pixels included in the frame of image is in a range of [m, n] or (m, n]. Herein, if the number of subpixels of the candidate color with a grayscale value greater than, or greater than or equal to q is in the range of [0, m) in the former description, the number of subpixels of the candidate color with a grayscale value greater than, or greater than or equal to q is in the range of [m, n] in the latter description. If the number of subpixels of the candidate color with a grayscale value greater than, or greater than or equal to q is in the range of [0, m] in the former description, the number of subpixels of the candidate color with a grayscale value greater than, or greater than or equal to q is in the range of (m,n] in the latter description.

Similarly, $$\text{"}0 \text{ to } \frac{(n \times 255)}{4}\text{"}$$

herein refers to $$\left[0, \frac{(n \times 255)}{4}\right] \text{ or } \left[0, \frac{(n \times 255)}{4}\right); \text{ "}\frac{(n \times 255)}{4} \text{ to } \frac{(n \times 255)}{2}\text{"}$$

refers to $$\left[\frac{(n \times 255)}{4}, \frac{(n \times 255)}{2}\right],$$
$$\text{or } \left[\frac{(n \times 255)}{4}, \frac{(n \times 255)}{2}\right),$$
$$\text{or } \left(\frac{(n \times 255)}{4}, \frac{(n \times 255)}{2}\right],$$
$$\text{or } \left(\frac{(n \times 255)}{4}, \frac{(n \times 255)}{2}\right);$$
$$\text{"}\frac{(n \times 255)}{2} \text{ to } \frac{3(n \times 255)}{4}\text{"}$$

refers to $$\left[\frac{(n \times 255)}{2}, \frac{3(n \times 255)}{4}\right], \text{ or}$$
$$\left[\frac{(n \times 255)}{2}, \frac{3(n \times 255)}{4}\right), \text{ or}$$
$$\left(\frac{(n \times 255)}{2}, \frac{3(n \times 255)}{4}\right], \text{ or}$$
$$\left(\frac{(n \times 255)}{2}, \frac{3(n \times 255)}{4}\right); \text{ and}$$
$$\text{"}\frac{3(n \times 255)}{4} \text{ to } 255m\text{"}$$

refers to $$\left[\frac{3(n \times 255)}{4}, 255n\right] \text{ or } \left(\frac{3(n \times 255)}{4}, 255n\right].$$

Moreover, there is no overlap between any two of the ranges of 0 to $$\frac{(n \times 255)}{4}, \frac{(n \times 255)}{4} \text{ to } \frac{(n \times 255)}{2},$$
$$\frac{(n \times 255)}{2} \text{ to } \frac{3(n \times 255)}{4} \text{ and } \frac{3(n \times 255)}{4} \text{ to } 255n.$$

Although n represents the number of the plurality of pixels in a frame of image, those skilled in the art will understand that, a pixel includes subpixels of a plurality of colors, and the number of subpixels of a certain color in each pixel is 1. That is, the number of pixels is the same as the number of subpixels of a certain color. Therefore, n also represents the number of subpixels of a certain candidate color in the plurality of pixels in a frame of image.

Figure 4A:
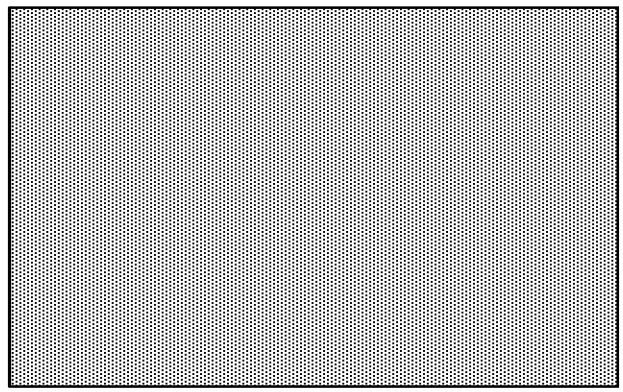
FIG. 4(a) is a schematic diagram showing a situation in which the number of subpixels of a candidate color with a grayscale value greater than or equal to q in a frame of image displayed by a display apparatus is 0 according to some embodiments of the present disclosure.
Figure 4B:
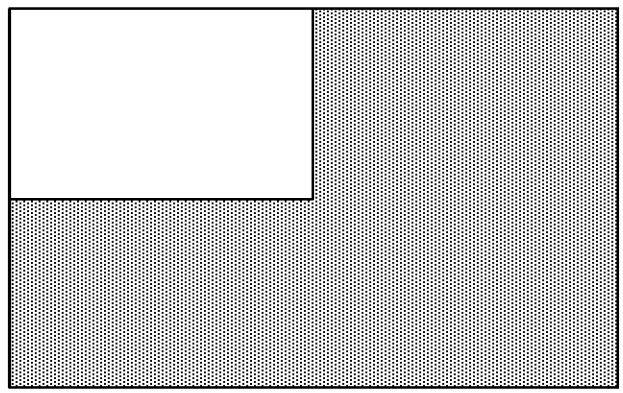
FIG. 4(b) is a schematic diagram showing a situation in which in a frame of image displayed by a display apparatus, the number of subpixels of a candidate color with a grayscale value greater than or equal to q is ¼ of the total number of pixels according to some embodiments of the present disclosure.
Figure 4C:
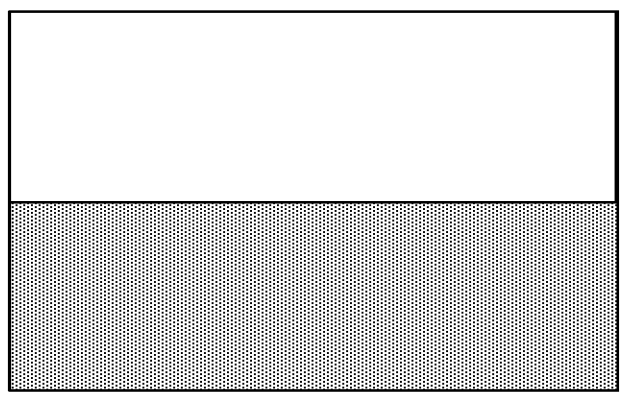
FIG. 4(c) is a schematic diagram showing a situation in which in a frame of image displayed by a display apparatus, the number of subpixels of a candidate color with a grayscale value greater than or equal to q is ½ of the total number of pixels according to some embodiments of the present disclosure.
Figure 4D:
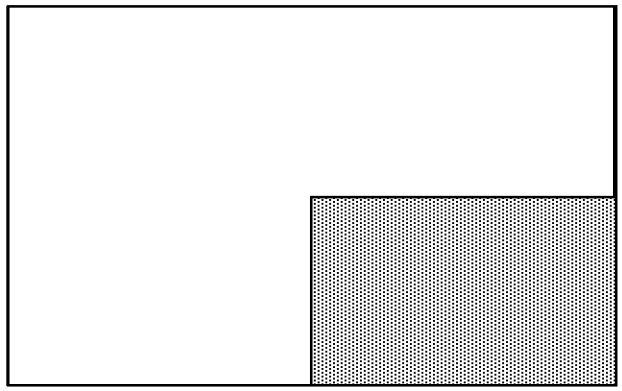
FIG. 4(d) is a schematic diagram showing a situation in which in a frame of image displayed by a display apparatus, the number of subpixels of a candidate color with a grayscale value greater than or equal to q is ¾ of the total number of pixels according to some embodiments of the present disclosure.
Figure 4E:
FIG. 4(e) is a schematic diagram showing a situation in which in a frame of image displayed by a display apparatus, the number of subpixels of a candidate color with a grayscale value greater than or equal to q is the same as the total number of pixels according to some embodiments of the present disclosure.

As shown in FIG. 4(e), the sum of the grayscale values of the subpixels of a candidate color in the n pixels included in one frame of image is 255n. Herein, 255 means that the grayscale value of one subpixel of a certain candidate color included in one frame of image is 255, and 255n is the sum of the grayscale values of the n subpixels when the n subpixels of the candidate color are all at maximum brightness. As shown in FIG. 4(d), the sum of the grayscale values of the subpixels of a candidate color in the n pixels included in one frame of image is $$\frac{3(n \times 255)}{4}.$$

That is, the sum of the grayscale values of the n subpixels of the candidate color is ¾ of the sum of the grayscale values of the n subpixels when the n subpixels of the candidate color are all at maximum brightness. As shown in FIG. 4(c), the sum of the grayscale values of the subpixels of a candidate color in the n pixels included in one frame of image is $$\frac{(n \times 255)}{2}.$$

That is, the sum of the grayscale values of the n subpixels of the candidate color is ½ of the sum of the grayscale values of the n subpixels when the n subpixels of the candidate color are all at maximum brightness. As shown in FIG. 4(b), the sum of the grayscale values of the subpixels of a candidate color in the n pixels included in one frame of image is $$\frac{(n \times 255)}{4}.$$

That is, the sum of the grayscale values of the n subpixels of the candidate color is ¼ of the sum of the grayscale values of the n subpixels when the n subpixels of the candidate color are all at maximum brightness. As shown in FIG. 4(a), the sum of the grayscale values of the subpixels of a candidate color in the n pixels included in one frame of image is 0, that is, the sum of the grayscale values of the n subpixels when the n subpixels of the candidate color are all at minimum brightness.

The grayscale value of each subpixel in the n subpixels of the candidate color is not limited. FIG. 4(b) only shows a situation in which the grayscale values of n/4 subpixels of a certain candidate color are all 255, and the grayscale values of the remaining 3n/4 subpixels are all 0, but the setting method is not limited thereto, as long as the sum of the grayscale values of the n subpixels of the candidate color is $$\frac{(n \times 255)}{4}.$$

Of course, the n/4 subpixels of a certain candidate color are not necessarily all concentrated in one region of a frame of image composed of n pixels, and the grayscale values of all subpixels of the candidate color in the region are not necessarily all 255. Positions of subpixels having a certain grayscale value of a certain candidate color and the grayscale values both depend on the actual content displayed by the display apparatus 10. Similarly, positions of subpixels having a certain grayscale value of a certain candidate color and the grayscale values shown in FIG. 4(c), FIG. 4(d), and FIG. 4(e) also all depend on the actual content displayed by the display apparatus 10, and details are not described herein again.

In embodiments of the present disclosure, there are two ways to calculate the display level of the subpixels of the candidate color according to the number of subpixels of the candidate color with a grayscale value greater than or equal to q in the plurality of pixels included in one frame of image. In the case where the number of subpixels of the candidate color with a grayscale value greater than or equal to q in the plurality of pixels included in one frame of image is in the range of 0 to m, the sum of the grayscale values of the subpixels of the candidate color in the plurality of pixels included in one frame of image are divided into four equal parts (i.e., the preset grayscale ranges) according to the range of the sum of the grayscale values of the subpixels of the candidate color in the plurality of pixels. Then, when the display apparatus 10 actually displays content, it is determined which preset grayscale range the sum of the grayscale values of the subpixels of the candidate color in the plurality of pixels included in one frame of image falls into. After that, according to the preset grayscale range into which the sum of the grayscale values falls, it is determined that the display level corresponding to the subpixels of each candidate color in the plurality of pixels included in the frame of image is a, b, c, or d. In a case where the number of subpixels of the candidate color with a grayscale value greater than or equal to q in the plurality of pixels included in a frame of image is in the range of m to n, it is directly determined that the display level of the subpixels of the candidate color is d. Calculation of this method is very simple. A display level corresponding to the subpixels of each candidate color in the frame of image may be accurately obtained according to the sum of the grayscale values of the subpixels of the candidate color in the plurality of pixels included in the frame of image and a corresponding relationship between the preset grayscale ranges and the display levels.

In some embodiments, the step of selecting one of the candidate colors as a selected color of a next detection cycle according to detection sequence determining parameters includes the following step.

A first threshold value and a second threshold value are used to divide a range of the usage degree representative values of the candidate colors in the current detection cycle to obtain a first interval, a second interval, and a third interval, and usage level representative values of the first interval, the second interval, and the third interval are gradually decreased. The first threshold value is a boundary point between the first interval and the second interval, the second threshold value is a boundary point between the second interval and the third interval, and the first threshold value is greater than the second threshold value. If there are candidate color(s) whose usage level representative value(s) fall into the first interval, one of the candidate color(s) whose usage level representative value(s) fall into the first interval is selected as the selected color of the next detection cycle. If the usage level representative values of the candidate colors all fall into the second interval or the second interval and the third interval, one of candidate color(s) whose usage level representative value(s) fall into the second interval is selected as the selected color of the next detection cycle. If the usage level representative values of the candidate colors all fall into the third interval, one of the candidate colors is selected as the selected color of the next detection cycle.

For example, assuming that the red subpixels are detected in the current detection cycle, and the candidate colors are green, blue, and white, if only the usage level representative value of green falls into the first interval, then green is selected as the selected color of the next detection cycle. If the usage level representative values of green and white both fall into the first interval, then green or white is selected as the selected color of the next detection cycle.

Assuming that the red subpixels are detected in the current detection cycle, and the candidate colors are green, blue, and white, in a case where none of the usage level representative values of green, blue and white falls into the first interval, if only the usage level representative value of green falls into the second interval and the usage level representative values of blue and white both fall into the third interval, then green is selected as the selected color of the next detection cycle; if the usage level representative values of green and white both fall into the second interval, and the usage level representative value of blue falls into the third interval, then green or white is selected as the selected color of the next detection cycle.

Assuming that the red subpixels are detected in the current detection cycle, and the candidate colors are green, blue, and white, if the usage level representative values of green, blue and white all fall into the third interval, then green, blue or white is selected as the selected color of the next detection cycle.

In some embodiments, in the current detection cycle, the first threshold value and the second threshold value are any two values in the range of the usage level representative values of the candidate colors, and the first threshold value is greater than the second threshold value. However, considering that the selected color of the next detection cycle is selected according to the first interval, the second interval and the third interval divided according to the first threshold value and the second threshold value, the first threshold value and the second threshold value are set to reasonable values. For example, the first threshold value and the second threshold value divide the range of the usage level representative values of the candidate colors in the current detection cycle into three equal parts.

A maximum value of the range of the usage level representative values of the candidate colors in the current detection cycle, the first threshold value, the second threshold value, and a minimum value of the range of the usage level representative values of the candidate colors in the current detection cycle are decreased in order. The first interval is defined by the maximum value of the range of the usage level representative values of the candidate colors in the current detection cycle and the first threshold value, the second interval is defined by the first threshold value and the second threshold value, and the third interval is defined by the second threshold value and the minimum value of the range of the usage level representative values of the candidate colors in the current detection cycle.

In some embodiments, the first threshold value falls into the first interval. In some other embodiments, the first threshold value falls into the second interval. In some embodiments, the second threshold value falls into the second interval. In some other embodiments, the second threshold value falls into the third interval. Moreover, there is no overlap between any two of the first interval, the second interval, and the third interval.

An order in which the usage level representative values of the candidate colors are obtained is not limited. In some embodiments, the usage level representative values of different candidate colors are obtained at the same time. In some other embodiments, the usage level representative values of different candidate colors are obtained sequentially. Herein, the usage level representative values of different candidate colors are obtained sequentially. In some embodiments, the usage level representative values of different candidate colors are obtained sequentially in a certain order. In some other embodiments, the usage level representative values of different candidate colors are obtained sequentially in a random manner.

In the case where the usage level representative values of different candidate colors are obtained sequentially, in some embodiments, if an obtained usage level representative value of a first candidate color falls into the first interval, then the candidate color is directly selected as the selected color of the next detection cycle, and usage level representative values of other candidate colors will not be obtained. In some other embodiments, after it is determined that the usage level representative value of the first candidate color falls into the first interval, the usage level representative values of other candidate colors are continuously obtained. If there are other candidate color(s) whose usage level representative value(s) fall into the first interval, then one of the candidate colors whose usage level representative values fall into the first interval is selected as the selected color of the next detection cycle.

In some embodiments of the present disclosure, one of the candidate colors is selected as the selected color of the next detection cycle by determining whether the usage level representative value of each candidate color falls into the first interval, the second interval, or the third interval in the current detection cycle. This method is simple and easy to implement.

In some embodiments, the detection sequence determining parameters further include a selected color of a previous detection cycle. The step of selecting one of the candidate colors as a selected color of a next detection cycle according to detection sequence determining parameters includes the following steps. A first threshold value and a second threshold value are used to divide a range of the usage degree representative values of the candidate colors in the current detection cycle to obtain a first interval, a second interval, and a third interval, and usage level representative values of the first interval, the second interval, and the third interval are gradually decreased in order. The first threshold value is a boundary point between the first interval and the second interval, the second threshold value is a boundary point between the second interval and the third interval, and the first threshold value is greater than the second threshold value. In a case where there are candidate color(s) whose usage level representative value(s) fall into the first interval, if the candidate color(s) whose usage level representative value(s) fall into the first interval include the selected color of the previous detection cycle and color(s) other than the selected color of the previous detection cycle, one of the candidate color(s) whose usage level representative values fall into the first interval other than the selected color of the previous detection cycle is selected as the selected color of the next detection cycle; if the candidate color(s) whose usage level representative value(s) fall into the first interval do not include the selected color of the previous detection cycle, one of the candidate color(s) whose usage level representative value(s) fall into the first interval is selected as the selected color of the next detection cycle; and if the candidate color whose usage level representative value falls into the first interval is the selected color of the previous detection cycle, the selected color of the previous detection cycle is selected as the selected color of the next detection cycle.

For example, assuming that the selected color of the previous detection cycle is green, the red subpixels are detected in the current detection cycle, and the candidate colors of the current detection cycle are green, blue, and white, if the usage level representative values of green and white both fall into the first interval, then white is selected as the selected color of the next detection cycle.

Assuming that the selected color of the previous detection cycle is green, and red subpixels are detected in the current detection cycle, the candidate colors of the current detection cycle are green, blue, and white. If only the usage level representative value of blue falls into the first interval, then blue is selected as the selected color of the next detection cycle. If the usage level representative values of blue and white both fall into the first interval, then blue or white is selected as the selected color of the next detection cycle.

Assuming that the selected color of the previous detection cycle is green, and red subpixels are detected in the current detection cycle, the candidate colors of the current detection cycle are green, blue, and white. If only the usage level representative value of green falls into the first interval, then green is selected as the selected color of the next detection cycle.

The step of selecting one of the candidate colors as a selected color of a next detection cycle according to detection sequence determining parameters includes the following steps. In a case where the usage level representative values of the candidate colors all fall into the second interval, or the second interval and the third interval, if candidate color(s) whose usage level representative value(s) fall into the second interval include the selected color of the previous detection cycle and color(s) other than the selected color of the previous detection cycle, one of the candidate color(s) whose usage level representative value(s) fall into the second interval other than the selected color of the previous detection cycle is selected as the selected color of the next detection cycle; if the candidate color(s) whose usage level representative value(s) fall into the second interval do not include the selected color of the previous detection cycle, one of the candidate color(s) whose usage level representative value(s) fall into the second interval is selected as the selected color of the next detection cycle; and if the candidate color(s) whose usage level representative value(s) fall into the second interval is the selected color of the previous detection cycle, the selected color of the previous detection cycle is selected as the selected color of the next detection cycle.

For example, assuming that the selected color of the previous detection cycle is green, and red subpixels are detected in the current detection cycle, the candidate colors of the current detection cycle are green, blue, and white. In the case where none of the usage level representative values of green, blue, and white falls into the first interval, if the usage level representative values of green and white both fall into the second interval, and the usage level representative value of blue falls into the third interval, then white is selected as the selected color of the next detection cycle.

Assuming that the selected color of the previous detection cycle is green, and red subpixels are detected in the current detection cycle, the candidate colors of the current detection cycle are green, blue, and white. In the case where none of the usage level representative values of green, blue, and white falls into the first interval, if only the usage level representative value of blue falls into the second interval, then blue is selected as the selected color of the next detection cycle; or, if only the usage level representative value of white falls into the second interval, then white is selected as the selected color of the next detection cycle; if the usage level representative values of blue and white both fall into the second interval and the usage level representative value of green falls into the third interval, then blue or white is selected as the selected color of the next detection cycle.

Assuming that the selected color of the previous detection cycle is green, and red subpixels are detected in the current detection cycle, the candidate colors of the current detection cycle are green, blue, and white. If only the usage level representative value of green falls into the second interval, and the usage level representative values of blue and white both fall into the third interval, then green is selected as the selected color of the next detection cycle.

The step of selecting one of the candidate colors as a selected color of a next detection cycle according to detection sequence determining parameters includes the following steps. In a case where the usage level representative values of the candidate colors all fall into the third interval, one of the candidate colors other than the selected color of the previous detection cycle is selected as the selected color of the next detection cycle. Assuming that the selected color of the previous detection cycle is green, and red subpixels are detected in the current detection cycle, the candidate colors of the current detection cycle are green, blue, and white. If the usage level representative values of green, blue, and white all fall into the third interval, then blue or white is selected as the selected color of the next detection cycle.

Since selection of the first threshold value and the second threshold value and division of the first interval, the second interval, and the third interval are described in detail above, details are not described herein again.

The order in which the usage level representative values of the candidate colors are obtained is not limited. In some embodiments, the usage level representative values of different candidate colors are obtained at the same time. In some other embodiments, the usage level representative values of different candidate colors are obtained sequentially. Herein, the usage level representative values of different candidate colors are obtained sequentially. In some embodiments, the usage level representative values of different candidate colors are obtained sequentially in a certain order. In some other embodiments, the usage level representative values of different candidate colors are obtained sequentially in a random manner.

In the case where the usage level representative values of different candidate colors are obtained sequentially, in some embodiments, if an obtained usage level representative value of a first candidate color falls into the first interval and the first candidate color is not the selected color of the previous detection cycle, then the candidate color is directly selected as the selected color of the next detection cycle, and usage level representative values of other candidate colors are not obtained. In some other embodiments, if the obtained usage level representative value of the first candidate color falls into the first interval, but the first candidate color is the selected color of the previous detection cycle, then the usage level representative values of other candidate colors will be obtained and intervals into which the usage level representative values of other candidate colors fall will be determined.

Of course, in the case where there are candidate color(s) whose usage level representative value(s) fall into the first interval, if the first candidate color is not the selected color of the previous detection cycle, after it is determined that the usage level representative value of the first candidate color falls into the first interval, the usage level representative values of other candidate colors may be continuously obtained. If there are other candidate color(s) whose usage level representative value(s) fall into the first interval, then one of all the candidate colors whose usage level representative values fall into the first interval is selected as the selected color of the next detection cycle.

In some embodiments of the present disclosure, in a case where both the selected color of the previous detection cycle and candidate colors other than the selected color of the previous detection cycle can be selected as the selected color of the next detection cycle, one of the candidate colors other than the selected color of the previous detection cycle is preferentially selected as the selected color of the next detection cycle. Since the selected color of the previous detection cycle has already been detected in the previous detection cycle, the method of determining the selected color of the next detection cycle provided in embodiments of the present disclosure makes it possible to detect each candidate color having a higher usage level representative value in a more timely manner.

In some embodiments, the detection sequence determining parameters further include priorities of the candidate colors. Among the priorities of the candidate colors, the selected color of the previous detection cycle has a lowest priority. The step of selecting one of the candidate colors as a selected color of a next detection cycle according to detection sequence determining parameters, includes: using a first threshold value and a second threshold value to divide a range of the usage degree representative values of the candidate colors in the current detection cycle to obtain a first interval, a second interval, and a third interval, usage level representative values of the first interval, the second interval, and the third interval being gradually decreased. The first threshold value is a boundary point between the first interval and the second interval, the second threshold value is a boundary point between the second interval and the third interval, and the first threshold value is greater than the second threshold value.

The step of selecting one of the candidate colors as a selected color of a next detection cycle according to detection sequence determining parameters, includes the following steps. Intervals into which the usage level representative values of the candidate colors respectively falls are sequentially determined according to the priorities of the candidate colors. If it is determined that a usage level representative value of a candidate color falls into the first interval, the candidate color is selected as the selected color of the next detection cycle. If the usage level representative values of the candidate colors all fall into the second interval or the second interval and the third interval, a candidate color having a highest priority among candidate color(s) whose usage level representative value(s) fall into the second interval is selected as the selected color of the next detection cycle. If the usage level representative values of the candidate colors all fall into the third interval, a candidate color having a highest priority among the candidate colors is selected as the selected color of the next detection cycle.

Figure 5A:
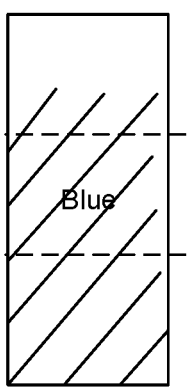
FIG. 5(a) is a first diagram showing a usage level representative value of a candidate color in a current detection cycle according to some embodiments of the present disclosure.
Figure 5A:
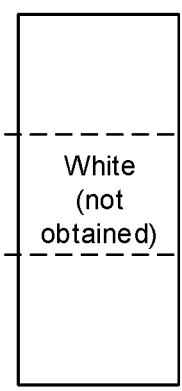
Figure 5A:
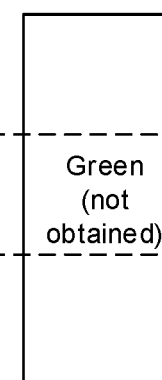
Figure 5B:
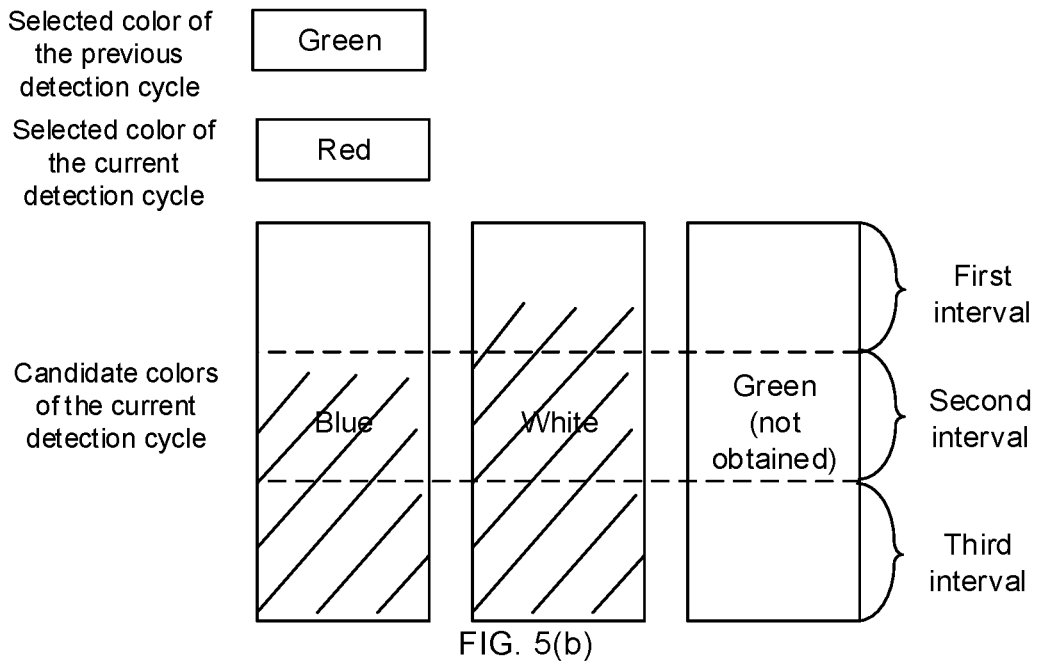
FIG. 5(b) is a second diagram showing usage level representative values of candidate colors in a current detection cycle according to some embodiments of the present disclosure.
Figure 5C:
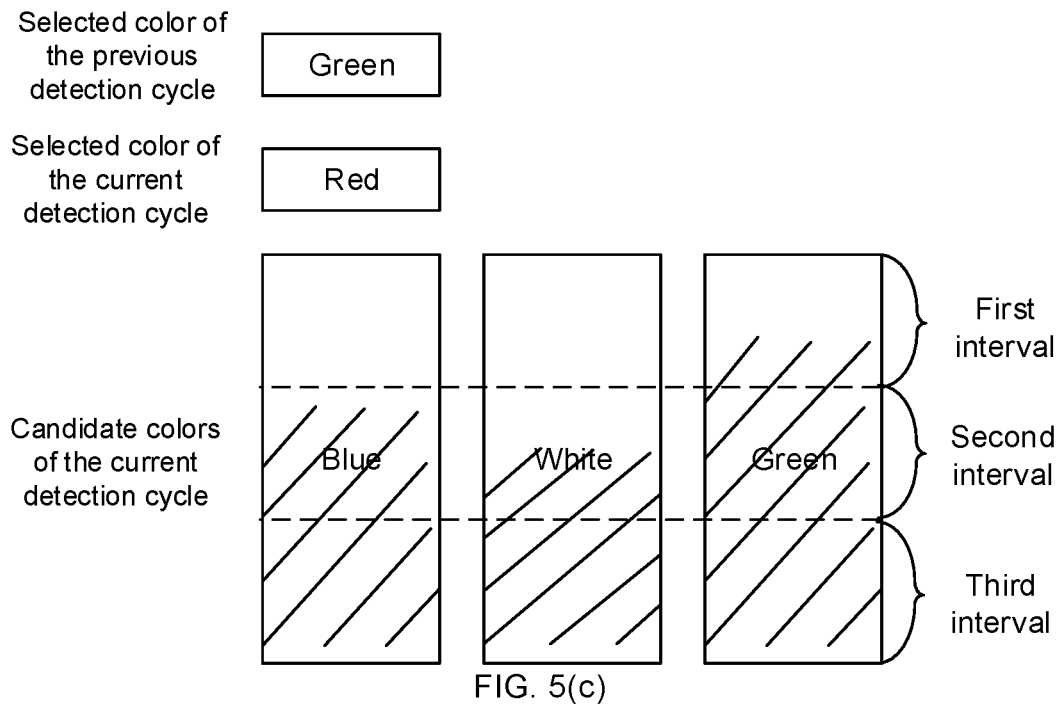
FIG. 5(c) is a third diagram showing usage level representative values of candidate colors in a current detection cycle according to some embodiments of the present disclosure.

For example, assuming that the selected color of the previous detection cycle is green, red subpixels are detected in the current detection cycle, and a priority order of the candidate colors is blue, white and green, as shown in FIG. 5(a), if the obtained usage level representative value of blue falls into the first interval, then blue is directly selected as the selected color of the next detection cycle, and the usage level representative values of white and green will not be obtained. As shown in FIG. 5(b), if the usage level representative value of blue falls into the second interval and the usage level representative value of white falls into the first interval, then white is selected as the selected color of the next detection cycle, and the usage level representative value of green will not be obtained. As shown in FIG. 5(c), if the usage level representative values of blue and white both fall into the second interval and the usage level representative value of green falls into the first interval, then green is selected as the selected color of the next detection cycle.

Figure 6A:
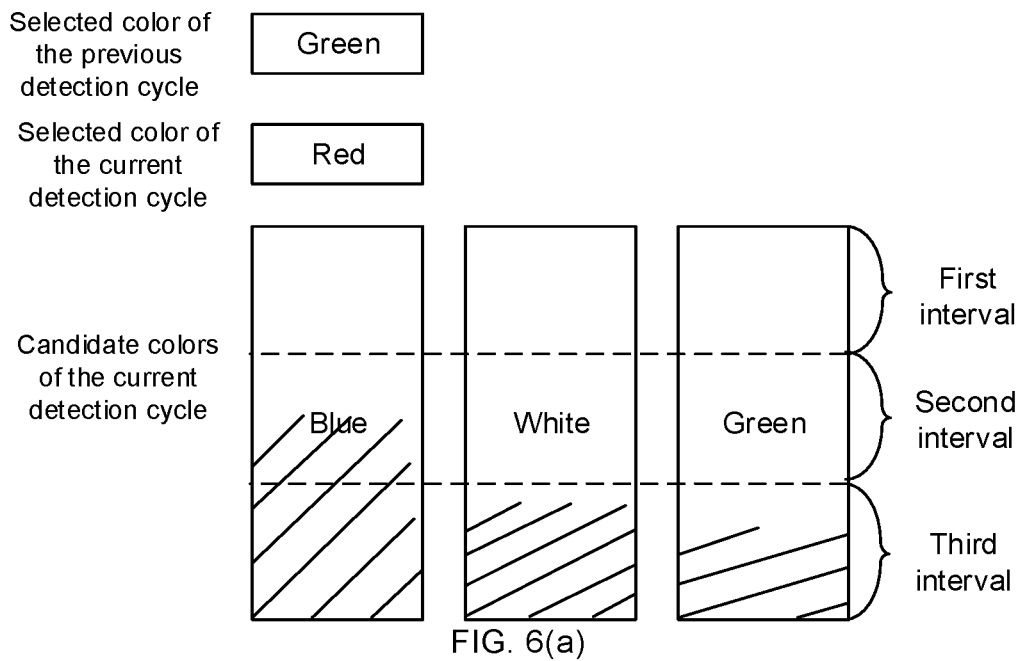
FIG. 6(a) is a fourth diagram showing usage level representative values of candidate colors in a current detection cycle according to some embodiments of the present disclosure.
Figure 6B:
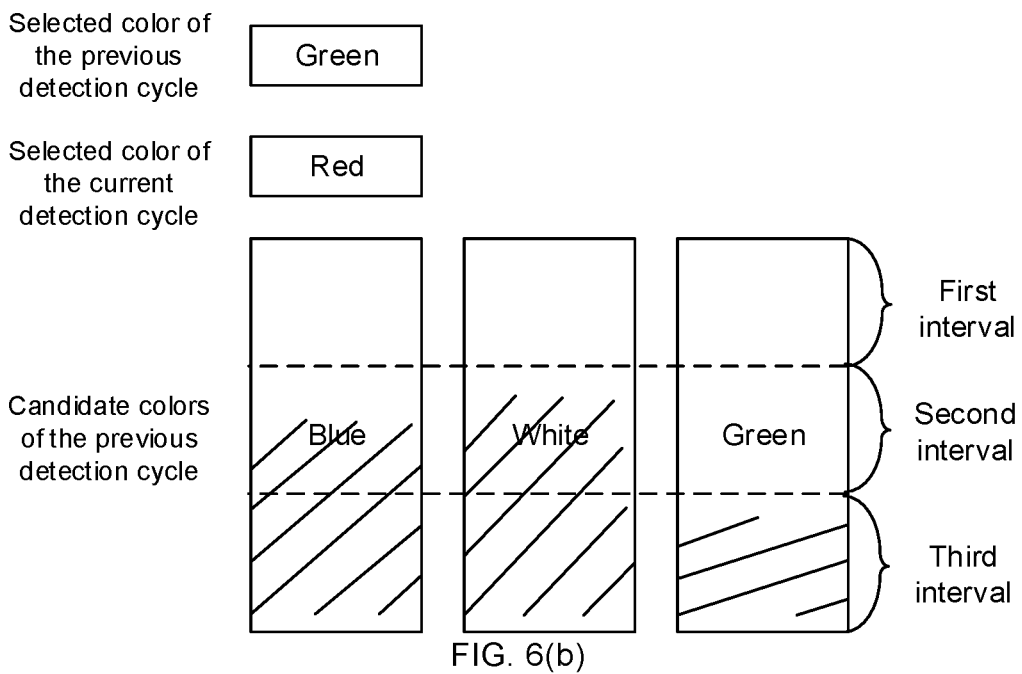
FIG. 6(b) is a fifth diagram showing usage level representative values of candidate colors in a current detection cycle according to some embodiments of the present disclosure.
Figure 6C:
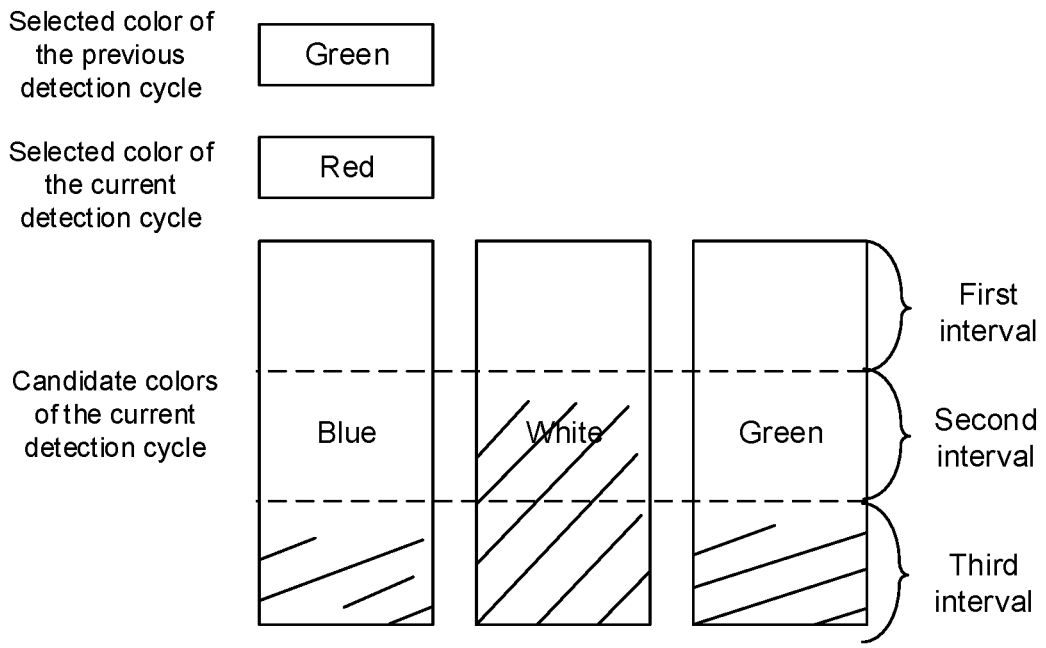
FIG. 6(c) is a sixth diagram showing usage level representative values of candidate colors in a current detection cycle according to some embodiments of the present disclosure.
Figure 6D:
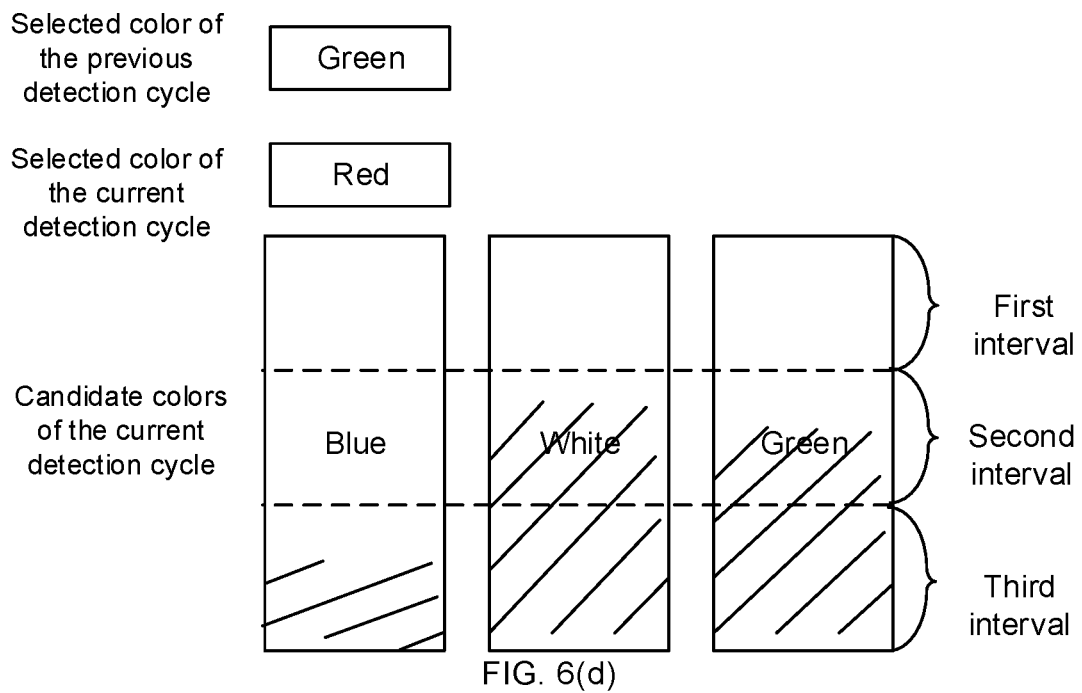
FIG. 6(d) is a seventh diagram showing usage level representative values of candidate colors in a current detection cycle according to some embodiments of the present disclosure.
Figure 6E:
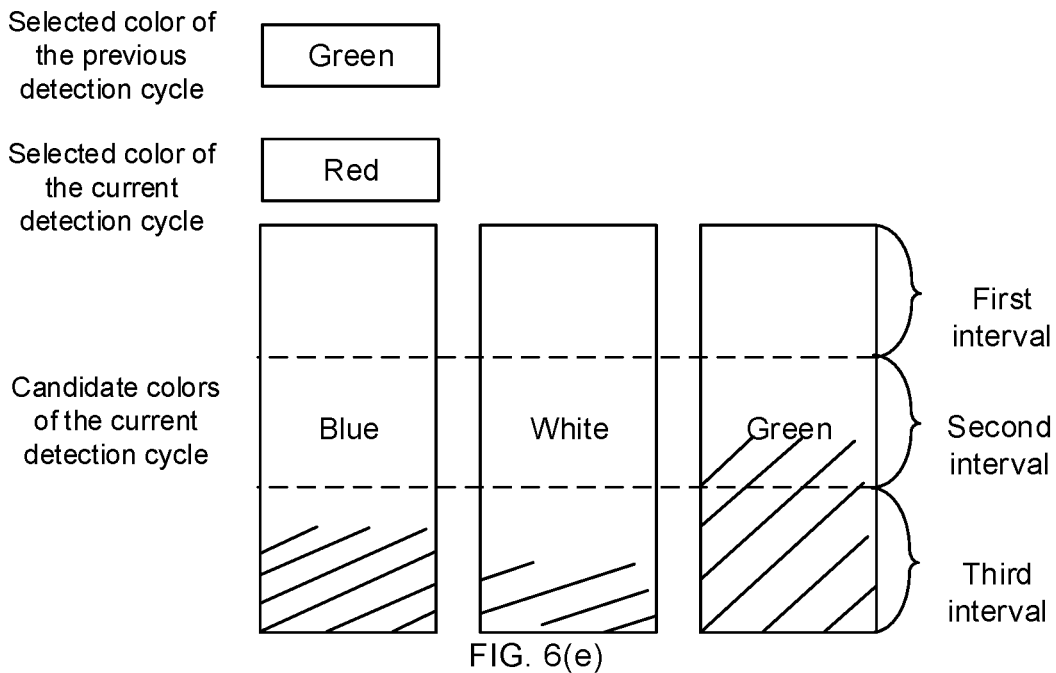
FIG. 6(*e*) is an eighth diagram showing usage level representative values of candidate colors in a current detection cycle according to some embodiments of the present disclosure.

For example, assuming that the selected color of the previous detection cycle is green, red subpixels are detected in the current detection cycle, and the priority order of the candidate colors is blue, white, and green, in the case where none of the usage level representative values of blue, white, and green falls into the first interval, as shown in FIG. 6(a), if only the usage level representative value of blue falls into the second interval, then blue is selected as the selected color of the next detection cycle. As shown in FIG. 6(b), if the usage level representative values of blue and white both fall into the second interval and the usage level representative value of green falls into the third interval, then blue is still selected as the selected color of the next detection cycle. As shown in FIG. 6(c), if only the usage level representative value of white falls into the second interval, then white is selected as the selected color of the next detection cycle. As shown in FIG. 6(d), if the usage level representative value of blue falls into the third interval, and the usage level representative values of white and green both fall into the second interval, then white is selected as the selected color of the next detection cycle. As shown in FIG. 6(e), if only the usage level representative value of green falls into the second interval, then green is selected as the selected color of the next detection cycle.

Figure 7:
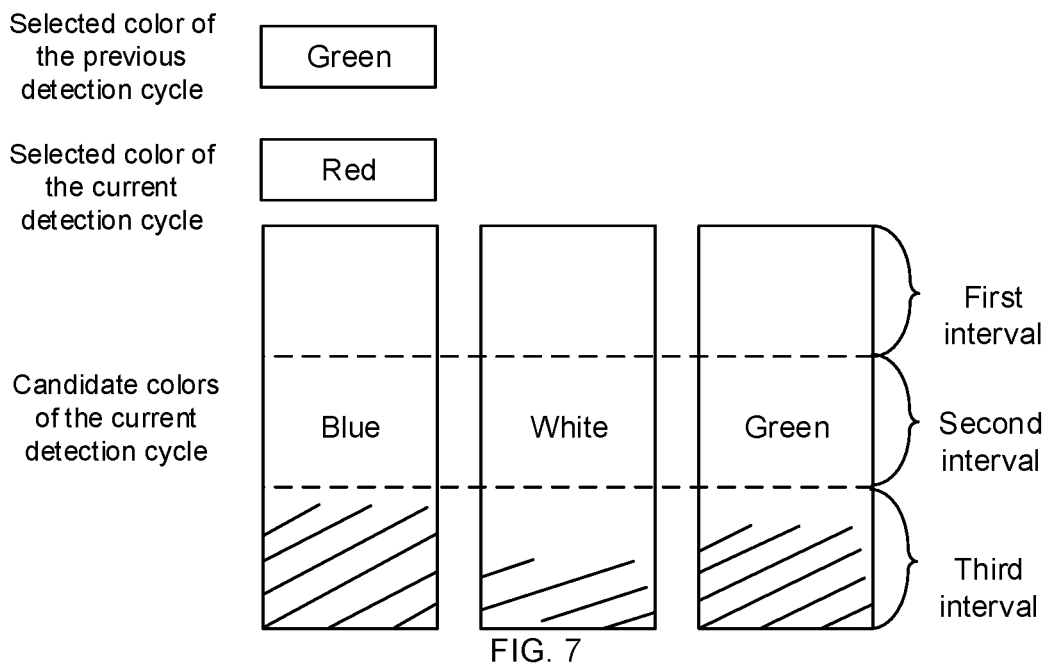
FIG. 7 is a ninth diagram showing usage level representative values of candidate colors in a current detection cycle according to some embodiments of the present disclosure.

For example, assuming that the selected color of the previous detection cycle is green, red subpixels are detected in the current detection cycle, and the priority order of the candidate colors is blue, white, and green, as shown in FIG. 7, in the case where the usage level representative values of blue, white, and green all fall into the third interval, blue is selected as the selected color of the next detection cycle.

Since the selection of the first threshold value and the second threshold value and the division of the first interval, the second interval, and the third interval are described in detail above, details are not described herein again.

In some embodiments of the present disclosure, the usage level representative values of different candidate colors are obtained sequentially according to the priorities of the candidate colors.

If the obtained usage level representative value of a candidate color having a highest priority falls into the first interval, this candidate color will be directly selected as the selected color of the next detection cycle, and the usage level representative values of other candidate colors will not be obtained. Of course, in a case where the obtained usage level representative value of a candidate color having the highest priority does not fall into the first interval, the usage level representative values of other candidate colors will be continuously obtained.

In any two detection cycles, since the selected color of the previous detection cycle and the selected color of the current detection cycle may not be the same, the priorities of the candidate colors may also be different in different detection cycles.

For example, an initial priority order of the candidate colors is: red, green, blue and white, a selected color of a first detection cycle is red, a selected color of a second detection cycle is white, a selected color of a third detection cycle is blue, and a selected color of a fourth detection cycle is green. In a case where the second detection cycle is considered to be the current detection cycle, a preset detection order of the candidate colors of the current detection cycle will be: green, blue, and red. In a case where the third detection cycle is considered to be the current detection cycle, the preset detection order of the candidate colors of the current detection cycle will be: red, green, and white. In a case where the fourth detection cycle is considered to be the current detection cycle, the preset detection order of the candidate colors of the current detection cycle will be: red, white, and blue.

There are no other detection cycles between any adjacent two of the first detection cycle, the second detection cycle, the third detection cycle, and the fourth detection cycle described above.

In some embodiments of the present disclosure, the intervals into which the usage level representative values of the candidate colors fall are sequentially determined according to the priorities of the candidate colors. In the case where both the selected color of the previous detection cycle and candidate colors other than the selected color of the previous detection cycle can be selected as the selected color of the next detection cycle, the candidate colors other than the selected color of the previous detection cycle are preferentially selected as the selected color of the next detection cycle. On this basis, in a case where the usage level representative value of the candidate color with the highest priority among the priorities of the candidate colors falls into the first interval, the usage level representative values of other candidate colors will no longer be obtained. The method of determining the selected color of the next detection cycle provided in the embodiments of the present disclosure makes it possible to detect each candidate color having a higher usage level representative value in a more timely manner, and saves a time of obtaining the usage level representative values of candidate colors. In addition, the method of determining the selected color of the next detection cycle provided in the embodiments of the present disclosure saves more time in obtaining the usage level representative values of the candidate colors.

In some embodiments, the first threshold value is ⅔ P; the second threshold value is ⅓ P; and P is a product of the number of frames of images in the detection cycle and a maximum value of display levels. The display levels are divided into level 0, level 1, level 2 and level 3.

Herein, it may be seen from the foregoing embodiments that a detection cycle includes a plurality of frames of images, and the usage level representative value of a candidate color in the current detection cycle may be obtained by adding up the display levels of subpixels of the candidate color in the plurality of frames of images.

If there are 2160 frames of images in the current detection cycle, a range of the usage level representative value of each candidate color will be 2160×0 to 2160×3, that is, 0 to 2160×3. The first threshold value Level1=2160×2, and the second threshold value Level2=2160×1.

In some embodiments, a range of the first interval is 2160×2 to 2160×3, a range of the second interval is 2160×1 to 2160×2, and a range of the third interval is 0 to 2160×1.

Of course, there is no overlap between the first interval and the second interval, and there is no overlap between the second interval and the third interval.

In some embodiments of the present disclosure, the first threshold value is set to ⅔ of a maximum value of a range of a usage level representative value of a certain candidate color, the second threshold value is set to ⅓ of the range of a maximum value of the usage level representative value of the candidate color, and the first threshold value and the second threshold value are used to equally divide the range of the usage level representative value of the candidate color to obtain the first interval, the second interval, and the third interval. A calculation process thereof is very simple.

Figure 8:
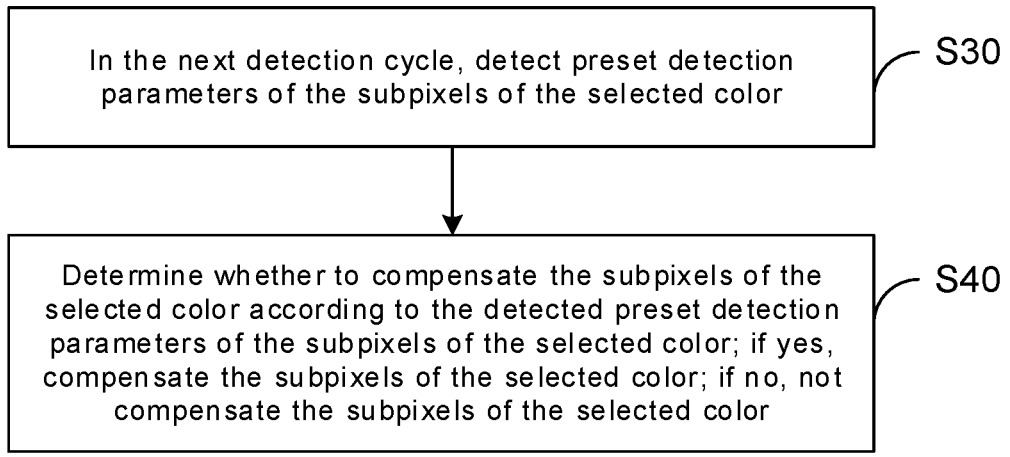
FIG. 8 is a schematic flowchart of a display method of a display apparatus according to some embodiments of the present disclosure.

Some embodiments of the present disclosure provide a display method of the display apparatus 10. The display method includes: determining the selected color of the next detection cycle according to the method described in any of the foregoing embodiments. As shown in FIG. 8, the display method further includes the following steps.

In S30, in the next detection cycle, preset detection parameters of the subpixels of the selected color in the display apparatus are detected.

The preset detection parameters of the subpixels of the selected color are used to indicate the degree of aging of the driving TFTs in the subpixels of the selected color. In some embodiments, the preset detection parameter is the degree of drift of the threshold voltage of the driving TFT. In some other embodiments, the preset detection parameter is the ratio of display luminance of the display apparatus to current.

In S40, it is determined whether to compensate the subpixels of the selected color in the display apparatus according to the detected preset detection parameters of the subpixels of the selected color in the display apparatus; if yes, the subpixels of the selected color in the display apparatus are compensated; if no, the subpixels of the selected color in the display apparatus are not compensated.

If the subpixels of the selected color need to be compensated, after the current detection cycle, when the display apparatus 10 displays one frame of image or a plurality of frames of images, the subpixels of the selected color may be compensated at the same time.

The display method of the display apparatus 10 provided by some embodiments of the present disclosure has the same technical effects as the method for determining a data processing sequence described above, and details are not described herein again.

Figure 9:
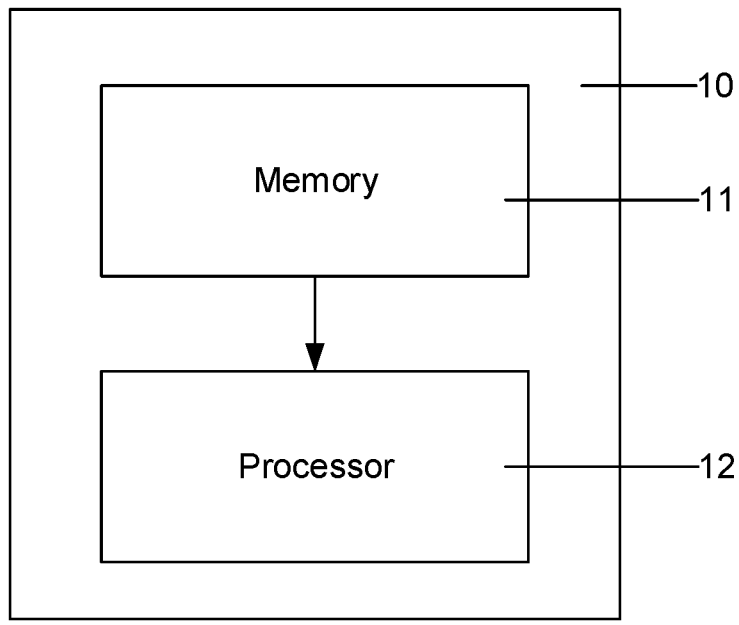
FIG. 9 is a schematic diagram of a display apparatus according to some embodiments of the present disclosure.

Some embodiments of the present disclosure provide a display apparatus 10. The display apparatus includes pixels, and each pixel includes a plurality of subpixels for displaying a plurality of colors. As shown in FIG. 9, the display apparatus 10 further includes a memory 11 and a processor 12.

The memory 11 is configured to store instruction(s). In some embodiments, the instruction(s) are program codes. One or more instructions are stored in the memory 11. The processor 12 is coupled to the memory 11. The instruction(s), when are executed by the processor 12, cause the processor 12 to perform the following steps: determining a usage level representative value of each candidate color in a current detection cycle according to grayscale values of subpixels of candidate colors in a plurality of pixels included in a plurality of frames of images displayed in the current detection cycle, the current detection cycle being used for detecting preset detection parameters of subpixels of the selected color in all or a portion of the pixels of the display apparatus, the selected color being one of the plurality of colors, and the candidate colors being colors other than the selected color in the plurality of colors; and selecting one of the candidate colors as a selected color of a next detection cycle according to detection sequence determining parameters, the detection sequence determining parameters including the usage level representative value of each candidate color in the current detection cycle. In some embodiments, the instruction(s), when are executed by the processor 12, further cause the processor 12 to perform the following steps: obtaining a display level corresponding to subpixels of each candidate color in a frame of image according to a sum of grayscale values of the subpixels of each candidate color in a plurality of pixels included in the frame of image and a corresponding relationship between preset grayscale ranges and display levels; and adding up display levels of the subpixels of each candidate color in the plurality of frames of images displayed in the current detection cycle to obtain the usage level representative value of each candidate color in the current detection cycle.

In some embodiments, the instruction(s), when are executed by the processor 12, further cause the processor 12 to perform the following steps: in a case where the number of subpixels of a candidate color with a grayscale value greater than or equal to q in the plurality of pixels included in the frame of image is in a range of 0 to m, if the sum of the grayscale values of the subpixels of the candidate color in the plurality of pixels included in the frame of image is in a range of 0 to $$\frac{(n \times 255)}{4},$$

determining that a display level of the subpixels of the candidate color is a; if the sum of the grayscale values of the subpixels of the candidate color in the plurality of pixels included in the frame of image is in a range of $$\frac{(n \times 255)}{4} \text{ to } \frac{(n \times 255)}{2},$$

determining that a display level of the subpixels of the candidate color is b; if the sum of the grayscale values of the subpixels of a candidate color in the plurality of pixels included in the frame of image is in a range of $$\frac{(n \times 255)}{2} \text{ to } \frac{3(n \times 255)}{4},$$

determining that a display level of the subpixels of the candidate color is c; if the sum of the grayscale values of the subpixels of the candidate color in the plurality of pixels included in the frame of image is in a range of $$\frac{3(n \times 255)}{4}$$

to 255n, determining that a display level of the subpixels of the candidate color is d. Herein, n is the number of the plurality of pixels included in the frame of image, m is 1% to 10% of the number of the plurality of pixels included in the frame of image, a is less than b, b is less than c, and c is less than d (a<b<c<d), and q is greater than or equal to 200 (q≥200); and in a case where the number of subpixels of the candidate color with a grayscale value greater than or equal to q in the plurality of pixels included in the frame of image is in a range of m to n, determining that a display level of the subpixels of the candidate color is d.

For simplicity of calculation, in some embodiments, a is set to 0, b is set to 1, c is set to 2, and d is set to 3.

In some embodiments, the instruction(s), when are executed by processor 12, further cause the processor 12 to perform the following steps: using a first threshold value and a second threshold value to divide a range of usage degree representative values of the candidate colors in the current detection cycle to obtain a first interval, a second interval, and a third interval, usage level representative values of the first interval, the second interval, and the third interval being gradually decreased in order;

if there are candidate color(s) whose usage level representative value(s) fall into the first interval, selecting one of the candidate color(s) whose usage level representative value(s) fall into the first interval as the selected color of the next detection cycle; if the usage level representative values of the candidate colors all fall into the second interval or the second interval and the third interval, selecting one of candidate color(s) whose usage level representative value(s) fall into the second interval as the selected color of the next detection cycle; and if the usage level representative values of the candidate colors all fall into the third interval, selecting one of the candidate colors as the selected color of the next detection cycle. The first threshold value is a boundary point between the first interval and the second interval, the second threshold value is a boundary point between the second interval and the third interval, and the first threshold value is greater than the second threshold value.

In some embodiments, the detecting sequence determining parameters further include a selected color of a previous detection cycle. The instruction(s), when are executed by the processor 12, further cause the processor 12 to perform the following steps: using a first threshold value and a second threshold value to divide a range of usage degree representative values of the candidate colors in the current detection cycle to obtain a first interval, a second interval, and a third interval, usage level representative values of the first interval, the second interval, and the third interval being gradually decreased;

in a case where there are candidate color(s) whose usage level representative value(s) fall into the first interval, if the candidate color(s) whose usage level representative value(s) fall into the first interval include the selected color of the previous detection cycle and color(s) other than the selected color of the previous detection cycle, selecting one of the candidate color(s) whose usage level representative value(s) fall into the first interval other than the selected color of the previous detection cycle as the selected color of the next detection cycle; if the candidate color(s) whose usage level representative value(s) fall into the first interval do not include the selected color of the previous detection cycle, selecting one of the candidate color(s) whose usage level representative value(s) fall into the first interval as the selected color of the next detection cycle; and if the candidate color(s) whose usage level representative value(s) fall into the first interval is the selected color of the previous detection cycle, selecting the selected color of the previous detection cycle as the selected color of the next detection cycle;

in a case where the usage level representative values of the candidate colors all fall into the second interval or the second interval and the third interval, if candidate color(s) whose usage level representative value(s) fall into the second interval include the selected color of the previous detection cycle and color(s) other than the selected color of the previous detection cycle, selecting one of the candidate color(s) whose usage level representative value(s) fall into the second interval other than the selected color of the previous detection cycle as the selected color of the next detection cycle; if the candidate color(s) whose usage level representative value(s) fall into the second interval do not include the selected color of the previous detection cycle, selecting one of the candidate color(s) whose usage level representative value(s) fall into the second interval as the selected color of the next detection cycle; and if the candidate color(s) whose usage level representative value(s) fall into the second interval is the selected color of the previous detection cycle, selecting the selected color of the previous detection cycle as the selected color of the next detection cycle; and in a case where the usage level representative values of the candidate colors all fall into the third interval, selecting one of the candidate colors other than the selected color of the previous detection cycle as the selected color of the next detection cycle. The first threshold value is a boundary point between the first interval and the second interval, the second threshold value is a boundary point between the second interval and the third interval, and the first threshold value is greater than the second threshold value.

In some embodiments, the detecting sequence determining parameters further include priorities of the candidate colors. Among the priorities of the candidate colors, the selected color of the previous detection cycle has a lowest priority. The instruction(s), when are executed by the processor 12, further cause the processor 12 to perform the following steps: using a first threshold value and a second threshold value to divide a range of the usage degree representative values of the candidate colors in the current detection cycle to obtain a first interval, a second interval, and a third interval, usage level representative values of the first interval, the second interval, and the third interval being gradually decreased;

sequentially determining intervals into which the usage level representative values of the candidate colors respectively fall according to the priorities of the candidate colors; if it is determined that a usage level representative value of a candidate color falls into the first interval, selecting the candidate color as the selected color of the next detection cycle; if the usage level representative values of the candidate colors all fall into the second interval or the second interval and the third interval, selecting a candidate color having a highest priority among candidate color(s) whose usage level representative value(s) fall into the second interval as the selected color of the next detection cycle; and if the usage level representative values of the candidate colors all fall into the third interval, selecting a candidate color having a highest priority among the candidate colors as the selected color of the next detection cycle. The first threshold value is a boundary point between the first interval and the second interval, the second threshold value is a boundary point between the second interval and the third interval, and the first threshold value is greater than the second threshold value.

In some embodiments, the first threshold value is $2/3$ P; the second threshold value is $1/3$ P; and P is a product of the number of frames of images in the current detection cycle and a maximum value of display levels; and the display levels are divided into: level 0, level 1, level 2, and level 3.

As for explanation of the processor 12 in the display apparatus 10 and the technical effects of the processor 12 in the display apparatus 10, reference may be made to part of description of the method for determining a data processing sequence in the foregoing embodiments, and details are not described herein again.

In some embodiments, the selected color of the next detection cycle is determined according to any one of the foregoing embodiments. The display apparatus 10 further includes a detector. The detector is configured to detect the preset detection parameters of the subpixels of the selected color in the next detection cycle. The instruction(s), when are executed by the processor 12, further cause the processor 12 to perform the following steps: determining whether to compensate the subpixels of the selected color according to the detected preset detection parameters of the subpixels of the selected color; if yes, compensating the subpixels of the selected color; if no, not compensating the subpixels of the selected color.

If it is necessary to compensate the subpixels of the selected color, after the current detection cycle, when the display apparatus 10 displays one frame of image or a plurality of frames of images, the subpixels of the selected color may be compensated at the same time.

With the above method, in the embodiments of the present disclosure, subpixels of candidate colors with a larger usage level representative value may be compensated in time, so as to ensure normal display of the display apparatus.

From description of the above embodiments, those skilled in the art will clearly understand that, for convenience and brevity of description, an example is only given according to the above division of functional modules. In practical applications, the above functions are allocated to different functional devices as needed. That is, an internal structure of the display apparatus is divided into different functional devices to perform all or part of the functions described above.

In the embodiments provided by the present disclosure, it will be understood that the display apparatus may be implemented in other ways. For example, the embodiments of the display apparatus described above are merely exemplary. For example, the division of the functional devices is only a logical functional division. In actual implementation, there are another division manners. For example, in some embodiments, a plurality of devices or groups are combined or integrated into another system, or some features may be ignored or not executed. In addition, mutual coupling or direct coupling or communication connection shown or discussed above may be indirect coupling or communication connection between the display apparatus and other devices through some interfaces. In some embodiments, connections are electrical, mechanical or in other forms.

The functional devices described above as separate components are physically separate in some embodiments, and are not physically separate in some other embodiments. For example, the functional devices in some embodiments of the present disclosure are integrated into one physical device, or distributed in different physical devices; or two or more devices are integrated into one physical device. In some other embodiments, one functional device is implemented by two or more physical devices in cooperation. In some embodiments, the integrated devices described above are implemented in the form of hardware. In some other embodiments, the integrated devices described above are implemented in the form of hardware and software functional devices.

In some embodiments, the integrated functional devices implemented in the form of software functional devices described above are stored in a computer readable storage medium. The above software functional devices are stored in a storage medium and include instruction(s) for causing a computer device to perform part of the steps of the methods described in the embodiments of the present disclosure. The storage medium includes various types of medium capable of storing program codes, such as a USB flash drive, a mobile disk, a Read-Only Memory (ROM), a Random-Access Memory (RAM), a magnetic disk, or an optical disk.

Finally, it will be noted that above embodiments are merely intended for describing the technical solutions of the present disclosure rather than limiting the present disclosure. Although the disclosure is described in detail with reference to the foregoing embodiments, it will be understood by those skilled in the art that modifications can be made to the technical solutions described in the foregoing embodiments, or equivalent replacements can be made to some technical features thereof. These modifications or replacements will not make the essence of the corresponding technical solutions depart from the spirit and scope of the technical solutions in the embodiments of the present disclosure.

What is claimed is:

1. A method for determining a data processing sequence, for determining a selected color in a plurality of colors display by subpixels included in each pixel of a display apparatus, and the method comprising:
   determining, according to grayscale values of subpixels of candidate colors and frequency of use of the subpixels of each candidate color in a plurality of pixels included in a plurality of frames of images displayed in a current detection cycle, a usage level representative value of each candidate color in the current detection cycle, wherein a usage level representative value of a candidate color is a sum of usage levels of all subpixels of the candidate color in the plurality of pixels, the selected color is one of the plurality of colors, and the candidate colors are colors other than the selected color in the plurality of colors; and
   selecting one of the candidate colors as a selected color of a next detection cycle according to detection sequence determining parameters, which includes:
      dividing a range of usage degree representative values of the candidate colors in the current detection cycle by using a first threshold value and a second threshold value, to obtain a first interval, a second interval, and a third interval, wherein the first threshold value is a boundary point between the first interval and the second interval, the second threshold value is a boundary point between the second interval and the third interval, the first threshold value is greater than the second threshold value, and usage level representative values of the first interval, the second interval, and the third interval are gradually decreased;
      if there are candidate color(s) whose usage level representative value(s) fall into the first interval, selecting one of the candidate color(s) whose usage level representative value(s) fall into the first interval as the selected color of the next detection cycle;
      if the usage level representative values of the candidate colors all fall into the second interval or the second interval and the third interval, selecting one of candidate color(s) whose usage level representative value(s) fall into the second interval as the selected color of the next detection cycle; and
      if the usage level representative values of the candidate colors all fall into the third interval, selecting one of the candidate colors as the selected color of the next detection cycle;
   and wherein the detection sequence determining parameters includes the usage level representative value of each candidate color in the current detection cycle.

2. The method according to claim 1, wherein determining, according to grayscale values of subpixels of candidate colors in a plurality of pixels included in a plurality of frames of images displayed in a current detection cycle, a usage level representative value of each candidate color in the current detection cycle, includes:
   obtaining, according to a sum of grayscale values of subpixels of each candidate color in a plurality of pixels included in a frame of image and a corresponding relationship between preset grayscale ranges and display levels, a display level corresponding to the subpixels of each candidate color in the frame of image; and
   adding up display levels of the subpixels of each candidate color in the plurality of frames of images displayed in the current detection cycle, to obtain the usage level representative value of each candidate color in the current detection cycle.

3. The method according to claim 2, wherein obtaining, according to a sum of grayscale values of subpixels of each candidate color in a plurality of pixels included in a frame of image and a corresponding relationship between preset grayscale ranges and display levels, a display level corresponding to the subpixels of each candidate color in the frame of image, includes:
   in a case where a number of subpixels of a candidate color with a grayscale value greater than or equal to q in the plurality of pixels included in the frame of image is in a range of 0 to m:
   if the sum of grayscale values of the subpixels of the candidate color in the plurality of pixels included in the frame of image is in a range of 0 to $$\frac{(n \times 255)}{4},$$

determining that a display level of the subpixels of the candidate color is a;
   if the sum of the grayscale values of the subpixels of the candidate color in the plurality of pixels included in the frame of image is in a range of $$\frac{(n \times 255)}{4} \text{ to } \frac{(n \times 255)}{2},$$

determining that a display level of the subpixels of the candidate color is b;
   if the sum of the grayscale values of the subpixels of the candidate color in the plurality of pixels included in the frame of image is in a range of $$\frac{(n \times 255)}{2} \text{ to } \frac{3(n \times 255)}{4},$$

determining that a display level of the subpixels of the candidate color is c; and
if the sum of the grayscale values of the subpixels of the candidate color in the plurality of pixels included in the frame of image is in a range of $$\frac{3(n \times 255)}{4}$$

determining that a display level of the subpixels of the candidate color is d, wherein n is the number of the plurality of pixels included in the frame of image, m is 1% to 10% of the number of the plurality of pixels included in the frame of image, a is less than b, b is less than c, and c is less than d, and q is greater than or equal to 200; and
in a case where the number of subpixels of the candidate color with a grayscale value greater than or equal to q in the plurality of pixels included in the frame of image is in a range of m to n, determining that a display level of the subpixels of the candidate color is d.

4. The method according to claim 1, wherein the detection sequence determining parameters further include a selected color of a previous detection cycle; and
selecting one of the candidate colors as a selected color of a next detection cycle according to detection sequence determining parameters, includes:
dividing a range of usage degree representative values of the candidate colors in the current detection cycle by using a first threshold value and a second threshold value, to obtain a first interval, a second interval, and a third interval, wherein the first threshold value is a boundary point between the first interval and the second interval, the second threshold value is a boundary point between the second interval and the third interval, the first threshold value is greater than the second threshold value, and usage level representative values of the first interval, the second interval, and the third interval are gradually decreased;
in a case where there are candidate color(s) whose usage level representative value(s) fall into the first interval:
if the candidate color(s) whose usage level representative value(s) fall into the first interval include the selected color of the previous detection cycle and color(s) other than the selected color of the previous detection cycle, selecting one of the candidate color(s) whose usage level representative value(s) fall into the first interval other than the selected color of the previous detection cycle as the selected color of the next detection cycle;
if the candidate color(s) whose usage level representative value(s) fall into the first interval do not include the selected color of the previous detection cycle, selecting one of the candidate color(s) whose usage level representative value(s) fall into the first interval as the selected color of the next detection cycle; and
if the candidate color(s) whose usage level representative value(s) fall into the first interval is the selected color of the previous detection cycle, selecting the selected color of the previous detection cycle as the selected color of the next detection cycle;
in a case where the usage level representative values of the candidate colors all fall into the second interval or the second interval and the third interval:
if candidate color(s) whose usage level representative value(s) fall into the second interval include the selected color of the previous detection cycle and color(s) other than the selected color of the previous detection cycle, selecting one of the candidate color(s) whose usage level representative value(s) fall into the second interval other than the selected color of the previous detection cycle as the selected color of the next detection cycle;
if the candidate color(s) whose usage level representative value(s) fall into the second interval do not include the selected color of the previous detection cycle, selecting one of the candidate color(s) whose usage level representative value(s) fall into the second interval as the selected color of the next detection cycle; and
if the candidate color(s) whose usage level representative value(s) fall into the second interval is the selected color of the previous detection cycle, selecting the selected color of the previous detection cycle as the selected color of the next detection cycle; and
in a case where the usage level representative values of the candidate colors all fall into the third interval, selecting one of the candidate colors other than the selected color of the previous detection cycle as the selected color of the next detection cycle.

5. The method according to claim 1, wherein the detection sequence determining parameters further include priorities of the candidate colors; and among the priorities of the candidate colors, a selected color of a previous detection cycle has a lowest priority; and
selecting one of the candidate colors as a selected color of a next detection cycle according to detection sequence determining parameters, includes:
dividing a range of usage degree representative values of the candidate colors in the current detection cycle by using a first threshold value and a second threshold value, to obtain a first interval, a second interval, and a third interval, wherein the first threshold value is a boundary point between the first interval and the second interval, the second threshold value is a boundary point between the second interval and the third interval, the first threshold value is greater than the second threshold value, and usage level representative values of the first interval, the second interval, and the third interval are gradually decreased;
sequentially determining intervals into which the usage level representative values of the candidate colors respectively fall according to the priorities of the candidate colors;
selecting a candidate color as the selected color of the next detection cycle if a usage level representative value of the candidate color falls into the first interval;
selecting a candidate color having a highest priority among candidate color(s) whose usage level representative value(s) fall into the second interval as the selected color of the next detection cycle if the usage level representative values of the candidate colors all fall into the second interval or the second interval and the third interval; and
selecting a candidate color having a highest priority among the candidate colors as the selected color of the next detection cycle if the usage level representative values of the candidate colors all fall into the third interval.

6. The method according to claim 1, wherein the first threshold value is ⅔ P; the second threshold value is ⅓ P; and P is a product of a number of frames of images in the current detection cycle and a maximum value of display levels; and the display levels are divided into: level 0, level 1, level 2, and level 3.

7. A display method of a display apparatus, the display method comprising:
determining the selected color of the next detection cycle according to the method according to claim 1, and
in the next detection cycle:
detecting preset detection parameters of subpixels of the selected color in the display apparatus; and
determining whether to compensate the subpixels of the selected color in the display apparatus according to the detected preset detection parameters of the subpixels of the selected color; if yes, compensating the subpixels of the selected color in the display apparatus; if no, not compensating the subpixels of the selected color in the display apparatus.

8. A computer readable storage medium storing program codes, wherein when the program codes are executed, the method for determining a data processing sequence according to claim 1 is implemented.

9. A computer program product comprising program codes that, when are run on a display apparatus, cause the display apparatus to perform the method for determining a data processing sequence according to claim 1.

10. A display apparatus, comprising:
pixels, each pixel including subpixels for displaying a plurality of colors;
a memory configured to store instruction(s); and
a processor coupled to the memory, wherein
the instruction(s), when are executed by the processor, cause the processor to:
determine a usage level representative value of each candidate color in a current detection cycle according to grayscale values of subpixels of candidate colors and frequency of use of the subpixels of each candidate color in a plurality of pixels included in a plurality of frames of images displayed in the current detection cycle, wherein the usage level representative value of a candidate color is a sum of usage levels of all subpixels of the candidate color in the plurality of pixels, the current detection cycle is used for detecting preset detection parameters of subpixels of the selected color in all or a portion of the pixels of the display apparatus, a selected color is one of the plurality of colors, and the candidate colors are colors other than the selected color in the plurality of colors;
select one of the candidate colors as a selected color of a next detection cycle according to detection sequence determining parameters, the detection sequence determining parameters including the usage level representative value of each candidate color in the current detection cycle;
divide a range of usage degree representative values of the candidate colors in the current detection cycle by using a first threshold value and a second threshold value, to obtain a first interval, a second interval, and a third interval, wherein the first threshold value is a boundary point between the first interval and the second interval, the second threshold value is a boundary point between the second interval and the third interval, the first threshold value is greater than the second threshold value, and usage level representative values of the first interval, the second interval, and the third interval are gradually decreased;
select one of the candidate color(s) whose usage level representative value(s) fall into the first interval as the selected color of the next detection cycle if there are candidate color(s) whose usage level representative value(s) fall into the first interval;
select one of candidate color(s) whose usage level representative value(s) fall into the second interval as the selected color of the next detection cycle if the usage level representative values of the candidate colors all fall into the second interval or the second interval and the third interval; and
select one of the candidate colors as the selected color of the next detection cycle if the usage level representative values of the candidate colors all fall into the third interval.

11. The display apparatus according to claim 10, wherein the instruction(s), when are executed by the processor, cause the processor to: obtain a display level corresponding to subpixels of each candidate color in a frame of image according to a sum of grayscale values of the subpixels of each candidate color in a plurality of pixels included in the frame of image and a corresponding relationship between preset grayscale ranges and display levels; and
add up display levels of the subpixels of each candidate color in the plurality of frames of images displayed in the current detection cycle to obtain the usage level representative value of each candidate color in the current detection cycle.

12. The display apparatus according to claim 11, wherein the instruction(s), when are executed by the processor, further cause the processor to:
in a case where a number of subpixels of a candidate color with a grayscale value greater than or equal to q in the plurality of pixels included in the frame of image is in a range of 0 to m:
if the sum of the grayscale values of the subpixels of the candidate color in the plurality of pixels included in the frame of image is in a range of 0 to $$\frac{(n \times 255)}{4},$$

determine that a display level of the subpixels of the candidate color is a;
if the sum of the grayscale values of the subpixels of the candidate color in the plurality of pixels included in the frame of image is in a range of $$\frac{(n \times 255)}{4} \text{ to } \frac{(n \times 255)}{2},$$

determine that a display level of the subpixels of the candidate color is b;
if the sum of the grayscale values of the subpixels of the candidate color in the plurality of pixels included in the frame of image is in a range of $$\frac{(n \times 255)}{2} \text{ to } \frac{3(n \times 255)}{4},$$

determine that a display level of the subpixels of the candidate color is c; and if the sum of the grayscale values of the subpixels of the candidate color in the plurality of pixels included in the frame of image is in a range of $$\frac{3(n \times 255)}{4}$$

to 255n, determine that a display level of the subpixels of the candidate color is d, wherein n is a number of the plurality of pixels included in the frame of image, m is 1% to 10% of the number of the plurality of pixels included in the frame of image, a is less than b, b is less than c, and c is less than d, and q is greater than or equal to 200; and in a case where the number of subpixels of the candidate color with a grayscale value greater than or equal to q in the plurality of pixels included in the frame of image is in a range of m to n, determine that a display level of the subpixels of the candidate color is d.

13. The display apparatus according to claim 10, wherein the detection sequence determining parameters further include a selected color of a previous detection cycle; and the instruction(s), when are executed by the processor, further cause the processor to:

divide a range of usage degree representative values of the candidate colors in the current detection cycle by using a first threshold value and a second threshold value, to obtain a first interval, a second interval, and a third interval, wherein the first threshold value is a boundary point between the first interval and the second interval, the second threshold value is a boundary point between the second interval and the third interval, the first threshold value is greater than the second threshold value, and usage level representative values of the first interval, the second interval, and the third interval are gradually decreased;

in a case where there are candidate color(s) whose usage level representative value(s) fall into the first interval:

if the candidate color(s) whose usage level representative value(s) fall into the first interval include the selected color of the previous detection cycle and color(s) other than the selected color of the previous detection cycle, select one of the candidate color(s) whose usage level representative value(s) fall into the first interval other than the selected color of the previous detection cycle as the selected color of the next detection cycle;

if the candidate color(s) whose usage level representative value(s) fall into the first interval do not include the selected color of the previous detection cycle, select one of the candidate color(s) whose usage level representative value(s) fall into the first interval as the selected color of the next detection cycle; and if the candidate color(s) whose usage level representative value(s) fall into the first interval is the selected color of the previous detection cycle, select the selected color of the previous detection cycle as the selected color of the next detection cycle;

in a case where the usage level representative values of the candidate colors all fall into the second interval or the second interval and the third interval:

if candidate color(s) whose usage level representative value(s) fall into the second interval include the selected color of the previous detection cycle and color(s) other than the selected color of the previous detection cycle, select one of the candidate color(s) whose usage level representative value(s) fall into the second interval other than the selected color of the previous detection cycle as the selected color of the next detection cycle;

if the candidate color(s) whose usage level representative value(s) fall into the second interval do not include the selected color of the previous detection cycle, select one of the candidate color(s) whose usage level representative value(s) fall into the second interval as the selected color of the next detection cycle; and if the candidate color(s) whose usage level representative value(s) fall into the second interval is the selected color of the previous detection cycle, select the selected color of the previous detection cycle as the selected color of the next detection cycle; and in a case where the usage level representative values of the candidate colors all fall into the third interval, select one of the candidate colors other than the selected color of the previous detection cycle as the selected color of the next detection cycle.

14. The display apparatus according to claim 10, wherein the detection sequence determining parameters further include priorities of the candidate colors, and among the priorities of the candidate colors, a selected color of a previous detection cycle has a lowest priority; and the instruction(s), when are executed by the processor, further cause the processor to:

divide a range of usage degree representative values of the candidate colors in the current detection cycle by using a first threshold value and a second threshold value, to obtain a first interval, a second interval, and a third interval, wherein the first threshold value is a boundary point between the first interval and the second interval, the second threshold value is a boundary point between the second interval and the third interval, the first threshold value is greater than the second threshold value, and usage level representative values of the first interval, the second interval, and the third interval are gradually decreased;

sequentially determine intervals into which the usage level representative values of the candidate colors respectively fall according to the priorities of the candidate colors;

select a candidate color as the selected color of the next detection cycle if a usage level representative value of the candidate color falls into the first interval;

select a candidate color having a highest priority among candidate color(s) whose usage level representative value(s) fall into the second interval as the selected color of the next detection cycle if the usage level representative values of the candidate colors all fall into the second interval or the second interval and the third interval; and select a candidate color having a highest priority among the candidate colors as the selected color of the next detection cycle if the usage level representative values of the candidate colors all fall into the third interval.

15. The display apparatus according to claim 10, wherein the first threshold value is ⅔ P; the second threshold value is ⅓ P; and P is a product of a number of frames of images in the current detection cycle and a maximum value of display levels; and the display levels are divided into: level 0, level 1, level 2, and level 3.

16. The display apparatus according to claim 10, further comprising a detector, wherein the detector is configured to detect preset detection parameters of subpixels of the selected color of the next detection cycle in all or a portion of the pixels of the display apparatus; and the instruction(s), when are executed by the processor, further cause the processor to: determine whether to compensate the subpixels of the selected color according to the detected preset detection parameters of the subpixels of the selected color; if yes, compensate the subpixels of the selected color; if no, not compensate the subpixels of the selected color.

* * * * *